US011570470B2

(12) United States Patent
Zhang et al.

(10) Patent No.: US 11,570,470 B2
(45) Date of Patent: Jan. 31, 2023

(54) COMPLEXITY REDUCTION OF OVERLAPPED BLOCK MOTION COMPENSATION

(71) Applicant: VID SCALE, INC., Wilmington, DE (US)

(72) Inventors: Yan Zhang, San Diego, CA (US); Xiaoyu Xiu, San Diego, CA (US); Yuwen He, San Diego, CA (US); Yan Ye, San Diego, CA (US)

(73) Assignee: VID SCALE, Inc., Wilmington, DE (US)

( * ) Notice: Subject to any disclaimer, the term of this patent is extended or adjusted under 35 U.S.C. 154(b) by 0 days.

(21) Appl. No.: 16/651,447

(22) PCT Filed: Sep. 28, 2018

(86) PCT No.: PCT/US2018/053395
§ 371 (c)(1),
(2) Date: Mar. 27, 2020

(87) PCT Pub. No.: WO2019/067879
PCT Pub. Date: Apr. 4, 2019

(65) Prior Publication Data
US 2020/0288168 A1    Sep. 10, 2020

Related U.S. Application Data

(60) Provisional application No. 62/564,618, filed on Sep. 28, 2017, provisional application No. 62/579,608, (Continued)

(51) Int. Cl.
*H04N 7/12*        (2006.01)
*H04N 19/583*     (2014.01)
(Continued)

(52) U.S. Cl.
CPC ......... *H04N 19/583* (2014.11); *H04N 19/139* (2014.11); *H04N 19/189* (2014.11); *H04N 19/176* (2014.11)

(58) Field of Classification Search
CPC .................................................... H04N 19/583
See application file for complete search history.

(56) References Cited

U.S. PATENT DOCUMENTS

2016/0219302 A1    7/2016   Liu et al.

OTHER PUBLICATIONS

Chen et al., "Algorithm Description of Joint Exploration Test Model 4", JVET-D1001_V3, Joint Video Exploration Team (JVET) of ITU-T SG 16 WP 3 and ISO/IEC JTC 1/SC 29/WG 11, 4th Meeting: Chengdu, CN, Oct. 15-21, 2016, 39 pages.
(Continued)

*Primary Examiner* — Y Lee
(74) *Attorney, Agent, or Firm* — Condo Roccia Koptiw LLP

(57) ABSTRACT

Overlapped block motion compensation (OBMC) may be performed for a current video block based on motion information associated with the current video block and motion information associated with one or more neighboring blocks of the current video block. Under certain conditions, some or all of these neighboring blocks may be omitted from the OBMC operation of the current block. For instance, a neighboring block may be skipped during the OBMC operation if the current video block and the neighboring block are both uni-directionally or bi-directionally predicted, if the motion vectors associated with the current block and the neighboring block refer to a same reference picture, and if a sum of absolute differences between those motion vectors is smaller than a threshold value. Further, OBMC may be conducted in conjunction with regular motion compensation and may use simplified filters than traditionally allowed.

29 Claims, 25 Drawing Sheets

Related U.S. Application Data filed on Oct. 31, 2017, provisional application No. 62/599,956, filed on Dec. 18, 2017, provisional application No. 62/731,069, filed on Sep. 13, 2018.

(51) Int. Cl.
    *H04N 19/139*    (2014.01)
    *H04N 19/189*    (2014.01)
    *H04N 19/176*    (2014.01)

(56) References Cited

OTHER PUBLICATIONS

Chen et al., "Algorithm Description of Joint Exploration Test Model 7 (JEM 7)", JVET-G1001-V1, Joint Video Exploration Team (JVET) of ITU-T SG 16 WP 3 and ISO/IEC JTC 1/SC 29/WG 11, 7th Meeting: Torino, IT, Jul. 13-21, 2017, 50 pages.

HEVC, "HM Reference Software JM-16.1", Also Available at <https://hevc.hhi.fraunhofer.de/svn/svn_HEVCSoftware>, Mar. 2016, 1 Page.

Hu et al., "Unification of Parameter Derivation for CCLM and LIC", JVET-D0122_V2, Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-6.

JVET, "Joint Exploration Model Reference Software Version 3 (JEM-3.0)", Available at <https://jvet.hhi.fraunhofer.de/svn/svn_HMJEMSoftware/tags/HM-16.6-JEM-3.0/>, Jun. 2016, 1 page.

Liu et al., "Local Illumination Compensation", VCEG-AZ06, Qualcomm Incorporated, ITU—Telecommunications Standardization Sector Study Group 16 Question 6 Video Coding Experts Group (VCEG), 52nd Meeting: Warsaw, Poland, Jun. 19-26, 2015, 4 pages.

Sullivan et al., "Overview of the High Efficiency Video Coding (HEVC) Standard", IEEE Transactions on Circuits and Systems for Video Technology, vol. 22, No. 12, Dec. 2012, pp. 1649-1668.

Tourapis et al. "H.264/14496-10 AVC Reference Software Manual", JVT-JVT-AE010, Dolby Laboratories Inc., Fraunhofer-Institute HHI, Microsoft Corporation, Joint Video Team (JVT) of ISO/IEC MPEG & ITU-T VCEG (ISO/IEC JTC1/SC29/WG11 and ITU-T SG16 Q.6), 31st Meeting: London, UK, Jun. 28-Jul. 3, 2009, 90 pages.

Xiu, et al., "Description of SDR, HDR and 360° Video Coding Technology Proposal by InterDigital Communications and Dolby Laboratories", JVET-J0015-V1, Joint Video Experts Team (JVET) of ITU-T SG 16 WP 3 and ISO/IEC JTC1/SC 29/WG 11, 10th Meeting: San Diego, US, Apr. 10-20, 2018, 82 pages.

HEVC, "HM Reference Software HM-16.9", Also Available at <https://hevc.hhi.fraunhofer.de/svn/svn_HEVCSoftware>, Mar. 2016, 1 Page.

COMPLEXITY REDUCTION OF OVERLAPPED BLOCK MOTION COMPENSATION

CROSS-REFERENCE TO RELATED APPLICATIONS

This application is the National Stage Entry under 35 U.S.C. § 371 of Patent Cooperation Treaty Application No. PCT/US2018/053395, filed Sep. 28, 2019, which claims the benefit of U.S. Provisional Patent Application No. 62/564,618, filed on Sep. 28, 2017, U.S. Provisional Patent Application No. 62/579,608, filed on Oct. 31, 2017, U.S. Provisional Patent Application No. 62/599,956, filed on Dec. 18, 2017, and U.S. Provisional Patent Application No. 62/731,069, filed on Sep. 13, 2018, the disclosures of which are incorporated herein by reference in their entireties.

BACKGROUND

Video coding can be challenging. To tackle the challenges of video coding, various types of video coding systems have been created and utilized, including block-based hybrid video coding systems. Various video coding standards for block-based hybrid video coding systems have been released.

SUMMARY

Systems, methods, and instrumentalities are described herein relating to the performance of overlapped block motion compensation (OBMC) for a current video block. Whether to perform OBMC for the current video block based on a neighboring block may be determined based on the difference between the motion information associated with the current video block and the motion information associated with the neighboring block. When the motion information such as motion vectors associated with the current block and the neighboring block is not substantially different from each other, OBMC based on the neighboring block may be omitted for the current block. For instance, a first motion vector associated with the current video block may be determined that refers to a specific reference picture. A second motion vector associated with a neighboring video block may be determined to also refer to the reference picture. Further, the current video block and the neighboring video block may both be predicted using a same directional prediction mode (e.g., a unidirectional mode or a bidirectional mode), and the difference between the first and second motion vectors (e.g., based on a sum of absolute difference (SAD) between the first motion vector and the second motion vector) may be determined to be not substantial (e.g., less than a threshold value). Under these conditions, OBMC based on the neighboring video block may be omitted for the current video block. Otherwise, OBMC based on the neighboring video block may be applied to the current video block.

When OBMC based on a neighboring block is applied to a current video block, regular motion compensation for the neighboring block may use an extended prediction block that comprises at least one more column or row of samples than a regular prediction block of the neighboring video block (e.g., the regular prediction block may be of the same block size as the second video block). The at least one more column or row of samples may be stored in memory and used in the OBMC operation of the current video block. For example, the at least one more column or row of samples may comprise a left-side column of samples located along a left boundary of the extended prediction block, and, during the OBMC operation of the current video block, this left-side column of samples may be used to compensate a right-side column of the current video block located along a right boundary of the current video block.

Further, simplified filters may be used for OBMC. For instance, OBMC for a luma component of the current video block may use a filter with a length shorter than 8 taps (e.g., a 2-tap bi-linear filter). Similarly, OBMC for a chroma component of the current video block may use a filter with a length shorter than 4 taps (e.g., a 2-tap bi-linear filter).

DETAILED DESCRIPTION

Figure 1A:
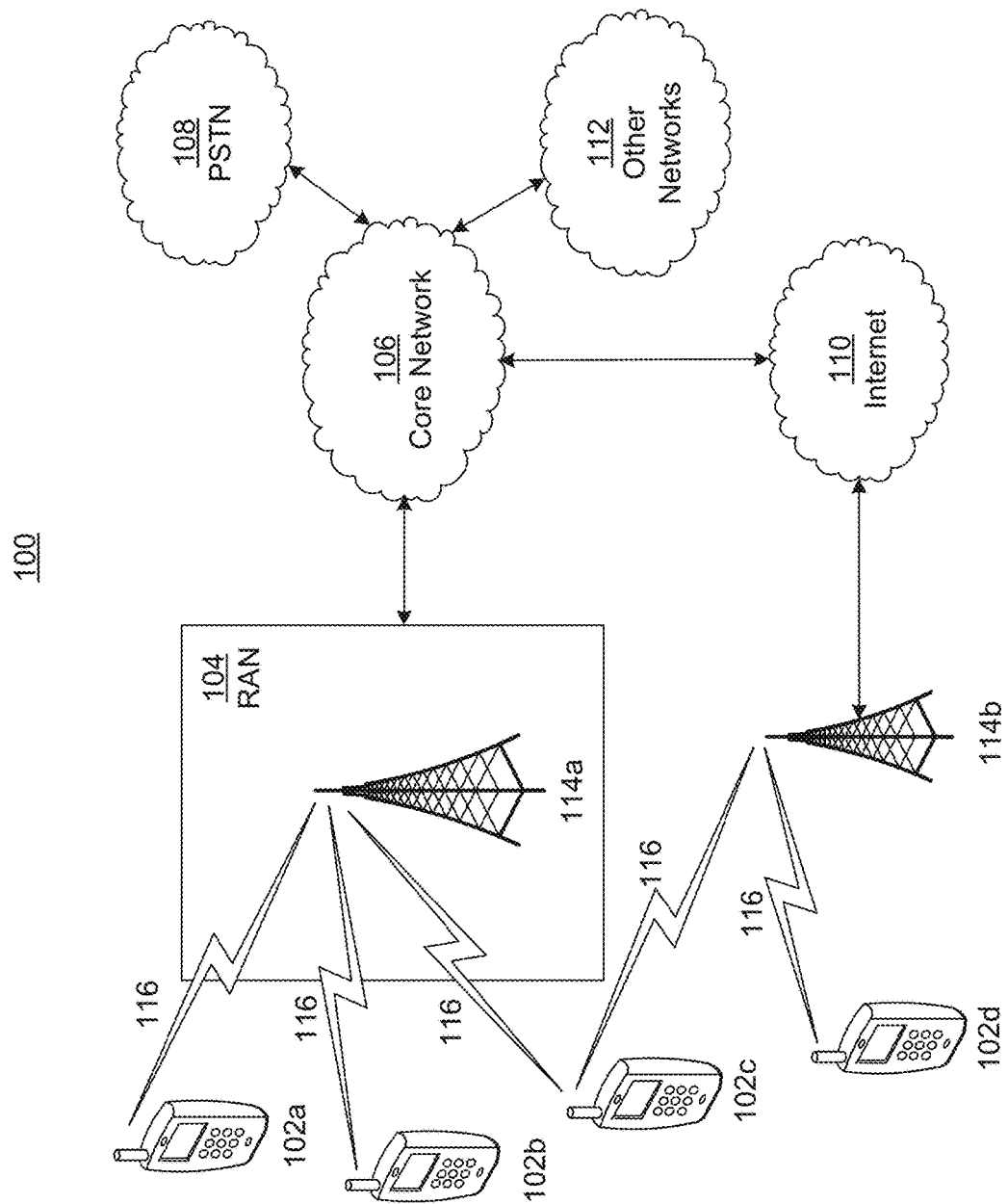
FIG. 1A is a system diagram illustrating an example communications system.

A more detailed understanding may be had from the following description, given by way of example in conjunction with the accompanying drawings wherein:

FIG. 1A is a diagram illustrating an example communications system 100 in which one or more disclosed examples may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed examples may contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in an example, the base station 114a may include three transceivers, i.e., one for each sector of the cell. In an example, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an example, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an example, the base station 114a and the WTRUs 102a, 102b, 102c may implement a radio technology such as NR Radio Access, which may establish the air interface 116 using New Radio (NR).

In an example, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In examples, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an example, the base station 114b and the WTRUs 102c, 102d may implement a radio technology such as IEEE 802.11 to establish a wireless local area network (WLAN). In an example, the base station 114b and the WTRUs 102c, 102d may implement a radio technology such as IEEE 802.15 to establish a wireless personal area network (WPAN). In an example, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
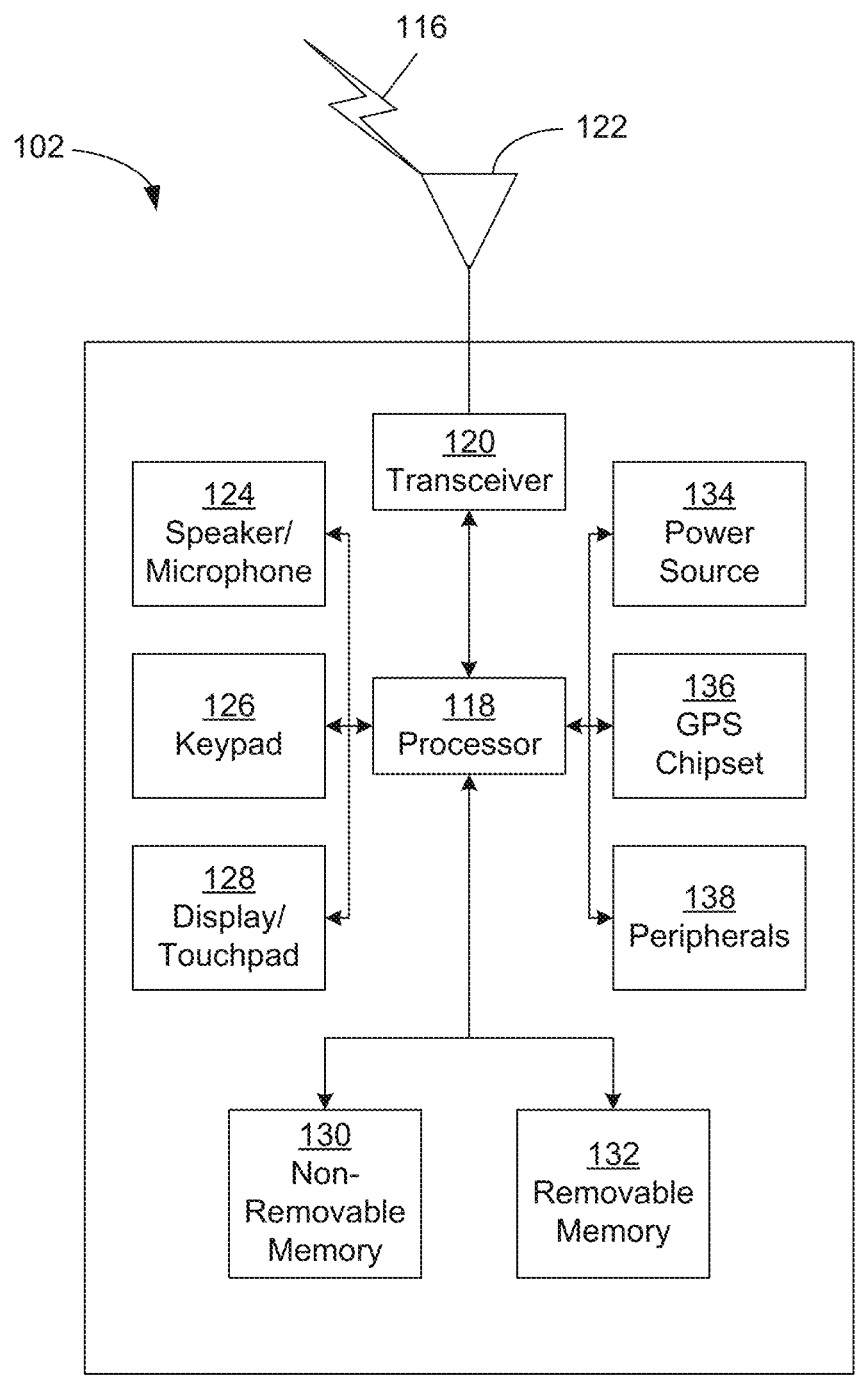
FIG. 1B is a system diagram illustrating an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in an example, the transmit/receive element 122 may be an antenna configured to transmit and/or receive RF signals. In an example, the transmit/receive element 122 may be an emitter/detector configured to transmit and/or receive IR, UV, or visible light signals, for example. In an example, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in an example, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In examples, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor a geolocation sensor an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an example, the WRTU 102 may include a half-duplex radio for which transmission and reception of some or all of the signals (e.g., associated with particular subframes for either the UL (e.g., for transmission) or the downlink (e.g., for reception)).

Figure 1C:
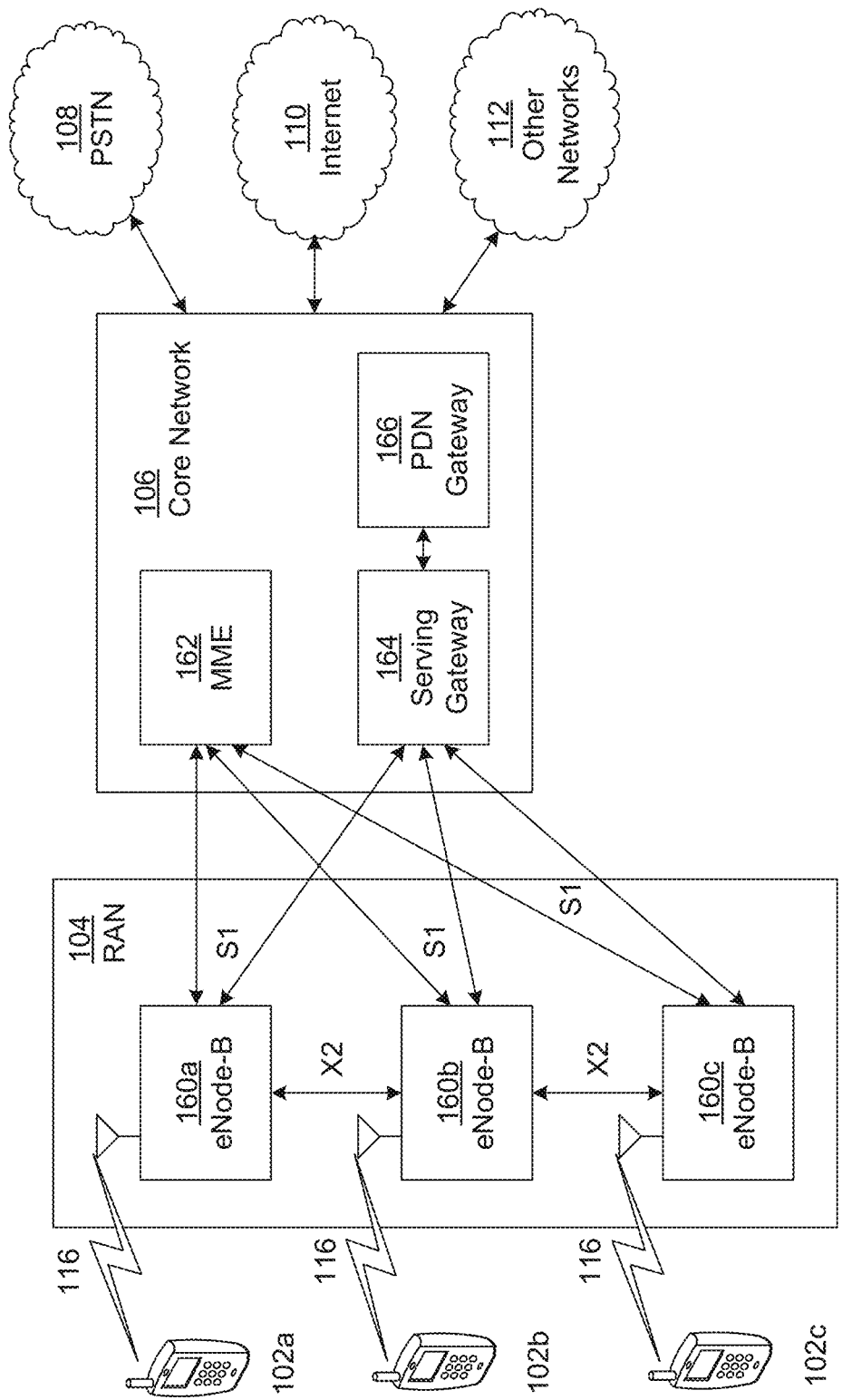
FIG. 1C is a system diagram illustrating an example radio access network (RAN) and an example core network (CN) that may be used within the communications system illustrated in FIG. 1A.

FIG. 1C is a system diagram illustrating an example RAN 104 and the CN 106. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs. The eNode-Bs 160a, 160b, 160c may each include one or more transceivers for communicating with the WTRUs 102a, 102b, 102c over the air interface 116. In an example, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b. 102c with access to the other networks 112, which may include other wired and/or wireless networks that are owned and/or operated by other service providers.

Although the WTRU is described in FIGS. 1A-1D as a wireless terminal, it is contemplated that in certain examples such a terminal may use (e.g., temporarily or permanently) wired communication interfaces with the communication network.

In examples, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In examples, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11 ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In examples, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz. 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to an example, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel.

The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11 ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11 ah is 6 MHz to 26 MHz depending on the country code.

Figure 1D:
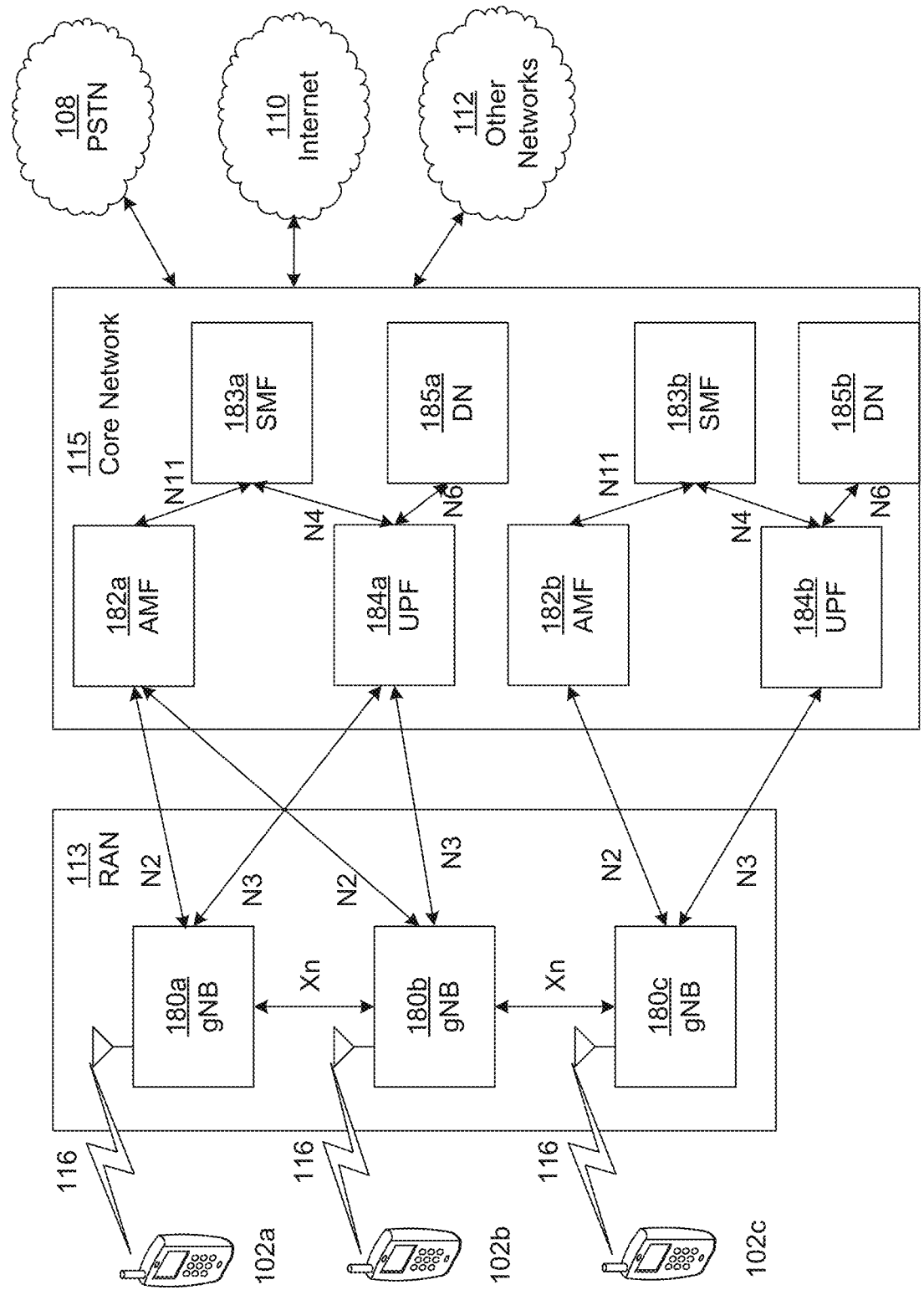
FIG. 1D is a system diagram illustrating a further example RAN and a further example CN that may be used within the communications system illustrated in FIG. 1A.

FIG. 1D is a system diagram illustrating an example RAN 113 and the CN 115. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs. The gNBs 180a, 180b, 180c may each include one or more transceivers for communicating with the WTRUs 102a, 102b, 102c over the air interface 116. In an example, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an example, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an example, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a. 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a. 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In an example, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
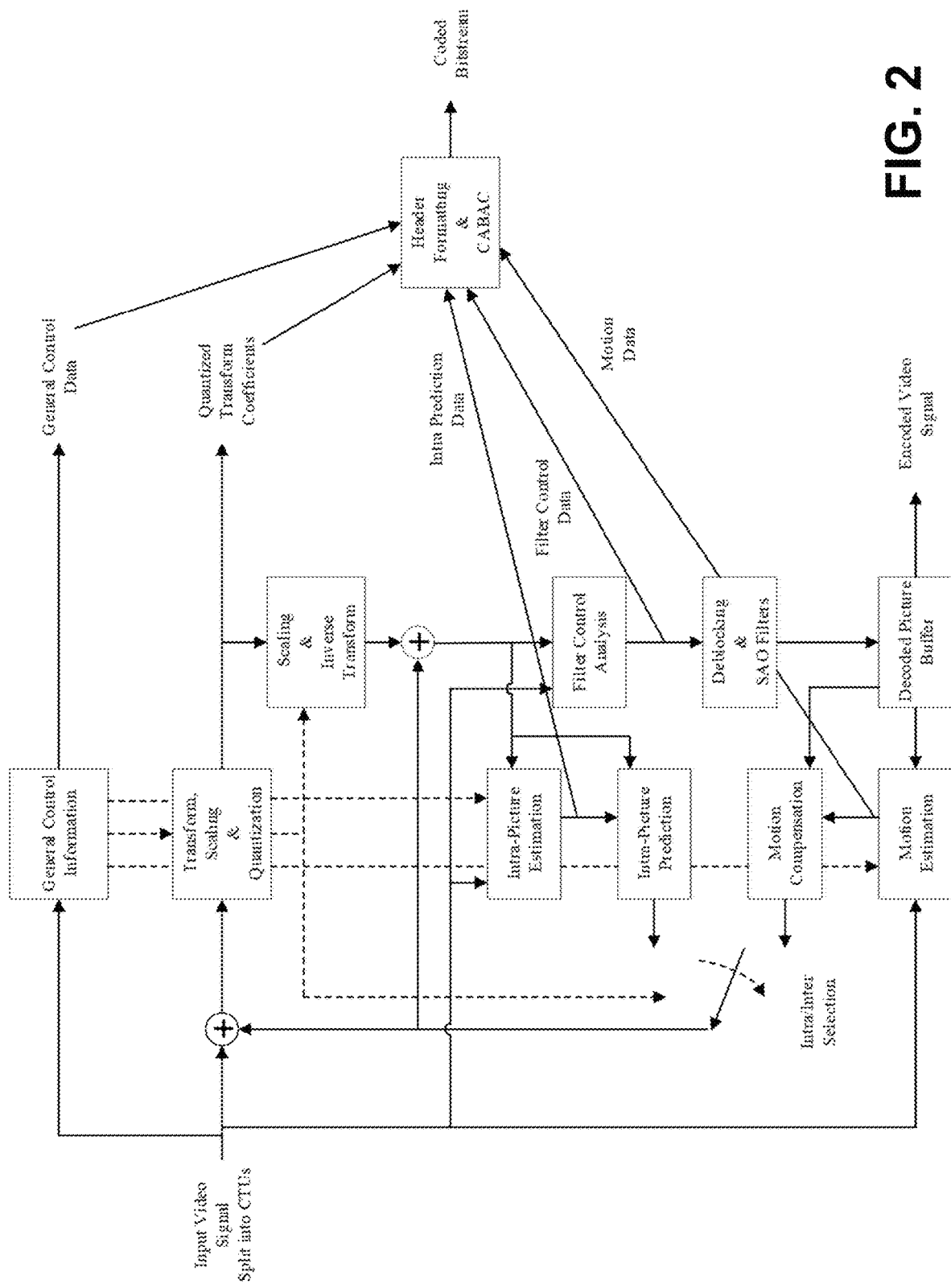
FIG. 2 is a diagram illustrating an example coding technique.

FIG. 2 shows an example block diagram illustrating an coding technique. The input video signal may be divided (e.g., evenly divided) into blocks (e.g., square blocks), which may also be referred to as CTUs (Coding Tree Units). A video block or CTU may have a size, such as 64×64 pixels (e.g., which may a maximum size of a block or CTU). A CTU may be split (e.g., split recursively). For example, a CTU may be split in a quad tree manner, for example, into Coding Units (CUs). The CTU may be split until the resulting CUs reach a size limit (e.g., a minimum size limit). A CU may be used as a basic unit for coding. Within a CU, prediction (e.g., the same prediction) may be applied. For example, intra prediction and/or inter prediction may be applied. For intra prediction, multiple modes (e.g., a total of 35 different modes) including angular mode(s) (e.g., 33 angular modes), DC mode(s), and/or planar mode(s) may be tested. Intra prediction may be used to exploit the spatial correlation between a block (e.g., a current block) and the block's spatial neighbors (e.g., neighboring blocks), for example, to remove the spatially redundant information. For inter prediction, block based motion search and motion compensation may be used to take a block in the current frame and search for a similar block in a previous coded slice/picture within a limited search range. It may be possible to take advantage of the similarity between sequential pictures, for example, so that temporal redundancy may be eliminated or reduced.

The example block diagram given by FIG. 2 shows processes such as Intra-Picture Estimation, Intra-Picture Prediction, Motion Estimation, and/or Motion Compensation. Various intra modes may be attempted, e.g., in Intra-Picture Estimation. Matching blocks may be searched for, e.g., in Motion Estimation. One or more candidates (e.g., candidates which may provide good coding performance) may be chosen. A suitable (e.g., the best) prediction mode of a predefined prediction method may be determined. The determination of such as a prediction mode (e.g., the best prediction mode) may be based on various criteria including, for example, rate-distortion (RD) costs, which may be computed through rate-distortion optimization. Rate and distortion may be factors that may decide the cost of a prediction mode. To compute the RD cost (e.g., for intra prediction), one or more intra mode indices may be recorded. 2D vectors (e.g., which may contain the amount of horizontal and vertical shift in pixels, with fractional precision) may be stored, e.g., for inter prediction.

Prediction errors may be calculated, e.g., in intra-picture prediction for intra prediction, in motion compensation for inter prediction, etc., The prediction errors may go through transform, scaling, and/or quantization, for example, to become the coefficients to de-correlate redundant information (e.g., to de-correlate redundant information before entropy encoding). After encoding the coefficients and/or other information, the number of bits for representing the current CU (e.g., the rate) may be known. The coefficients may go through scaling and/or inverse transform, for example, to compute the reconstruction error. The reconstruction error may be used for the computation of distortion. The cost for a (e.g., for each of the) prediction mode may be calculated and/or compared. The prediction mode with the smallest cost may be selected for the current CU. The reconstructed error may be added to the prediction block, for example, to acquire the reconstructed block. After a (e.g., each) block of the current slice/picture is encoded, one or more filters (e.g., deblocking and/or SAO filter, which may be designed via filter analysis control) may be performed on the reconstructed slice/picture, for example, before being buffered in the decoded picture buffer to serve as reference for future encoding purposes. Control information from general control information and filter control information from filter control analysis may be entropy encoded. For example, together with the prediction information, control information from general control information and filter control information from filter control analysis may be entropy encoded (e.g., in a header formatting and/or CABAC block) to arrive at the desired encoding bitstream.

Figure 3:
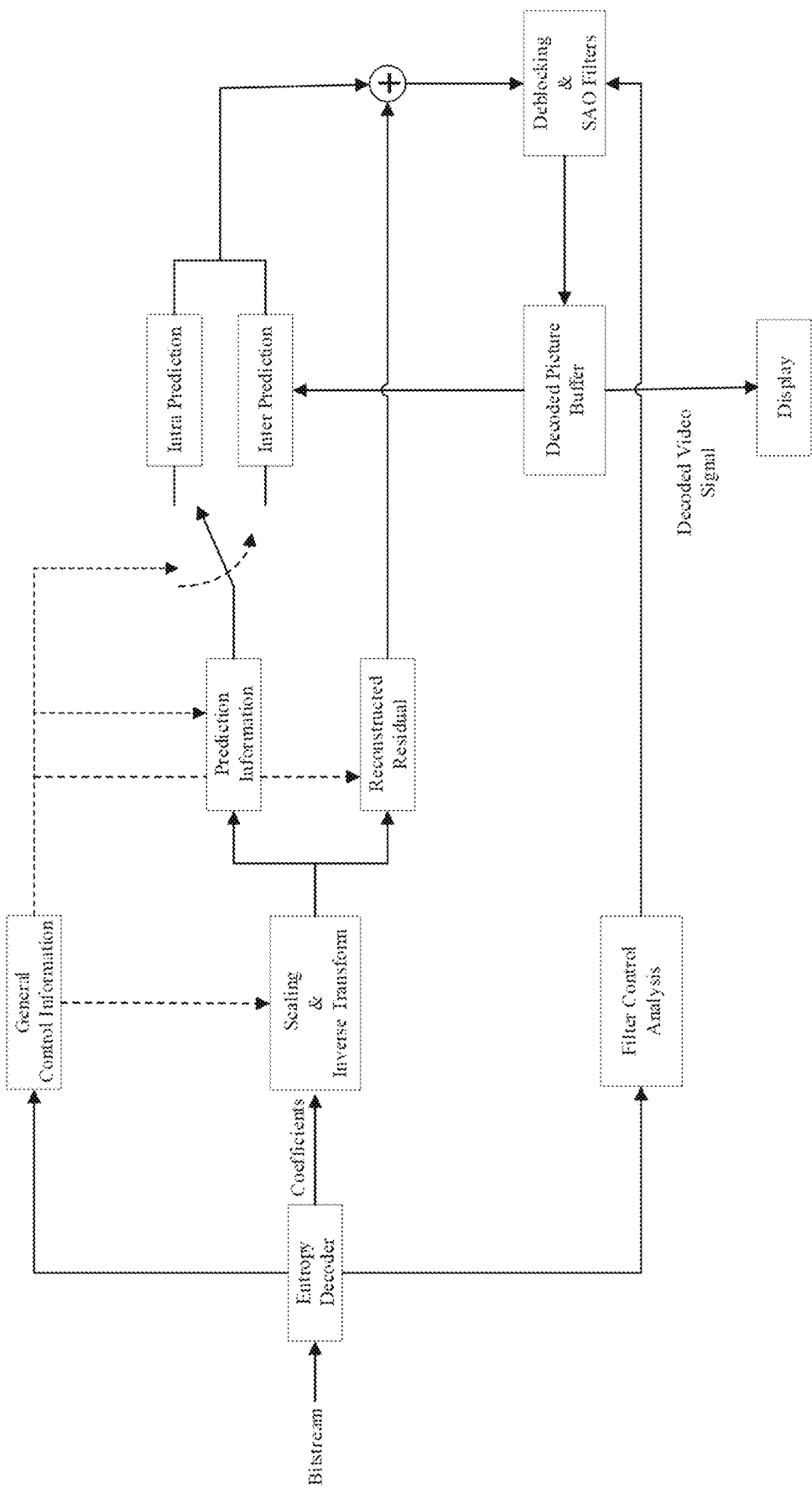
FIG. 3 is a diagram illustrating an example decoding device.

For decoding, the bitstream may go through an entropy decoder to obtain general control information and/or filter control analysis and coefficients. General control information may control the decoding operations including slice reconstruction. Filter control analysis may determine the deblocking & SAO filters that may be used for post processing. The coefficients may include information that may be used to rebuild a slice (e.g., the current slice). The coefficients may be transformed to prediction information and reconstructed residual (e.g., via scaling and/or inverse transform). Depending on the prediction technique utilized (e.g., intra or inter prediction), prediction information may be used to switch the path for the corresponding block accordingly (e.g., to intra prediction or inter prediction). An image may be reconstructed using reconstructed residuals. After deblocking and/or SAO filters, the image (e.g., the final rebuilt image) may be buffered as reference for decoding, and/or as output for displaying. FIG. 3 is an example block diagram of a decoder.

Overlapped block motion compensation (OBMC) may be applied to reduce blocking artifacts at the motion compensation stage. Sub-CU inter prediction (e.g., which may involve Sub-CU based motion vector prediction) may be performed, for example, in conjunction with OBMC. A Sub-CU based inter prediction mode may utilize frame-rate up conversion (FRUC), affine merge, advanced temporal motion vector prediction (ATMVP), and/or spatial temporal motion prediction (STMVP). Depending on the CU size, a sub-CU block for FRUC may include 4×4, 8×8, and/or 16×16 pixels. For affine merge, ATMVP, and/or STMVP, a sub-CU block size may be (e.g., may always be) 4×4 pixels.

FRUC may be used in inter prediction. With FRUC, motion vectors may not be signaled to the decoder side for a (e.g., each) sub-CU block. The motion vectors may be derived at the decoder. There may be one or more (e.g., different) FRUC modes, such as a bilateral matching mode and/or a template matching mode.

Figure 4:
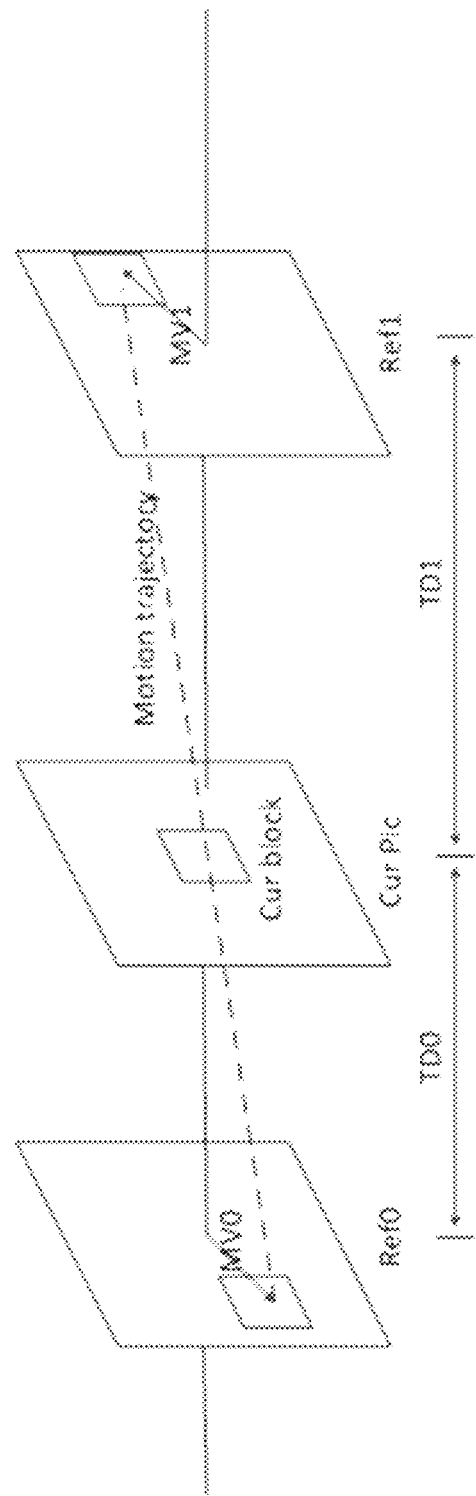
FIG. 4 is a diagram illustrating an example of a bilateral matching mode.

In the bilateral matching mode, motion vectors may be derived via a continuous motion trajectory. At the CU level, motion vectors from a merge candidate list and/or a set of preliminary motion vectors generated from the motion vectors of one or more temporal collocated blocks of the current block may be used as starting points. FIG. 4 shows an example implementation of a bilateral matching mode. As shown, a first motion vector (e.g., MV0) associated with a first prediction block in a given direction may be taken and a second motion vector (e.g., MV1) associated with a second prediction block may be derived based on (e.g., in proportion to) the temporal distances between the current block, the first prediction block and the second prediction block (e.g., based on the temporal distance scaling factor between TD1 and TD0 of FIG. 4). Using the motion vectors (e.g., the MV0 and MV1) for motion compensation, the sum of absolute difference (SAD) value between the two prediction blocks may be computed. The motion vector pair that brings the smallest SAD value (e.g., computed from the two prediction blocks) may be determined as the best CU-level motion vector. After the best CU-level motion vector is determined, the best CU-level motion may be refined at the CU level, for example, by comparing the SAD value of the nearby positions that the CU-level best motion vector is pointing to with the CU-level best SAD. The CU may be divided into sub-CU blocks. The motion vector redefined at the CU level may be used (e.g., used as the starting point) and/or may be refined in the sub-CU level. After the sub-CU level refinement, a sub-CU block (e.g., each of the sub-CU blocks) may have its own motion vector.

Figure 5:
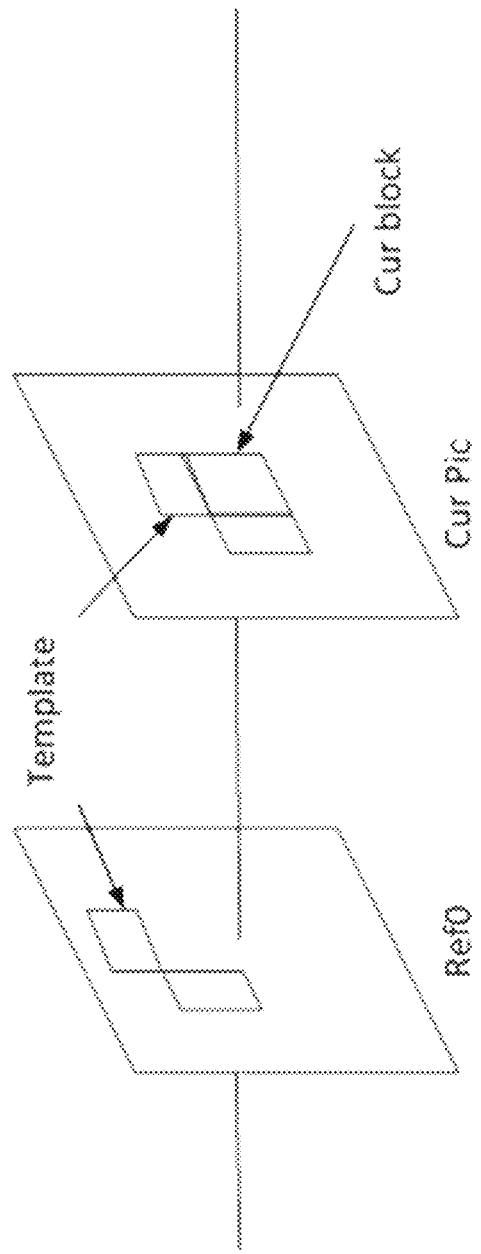
FIG. 5 is a diagram illustrating an example of a template matching mode.

In the template matching mode, a starting motion vector candidate may be the same as in the bilateral mode, for example, at the CU level. FIG. 5 shows an example of finding motion vectors (e.g., the best motion vectors) in the template matching mode. The template of the current block and the template of a reference block may be compared for one or more differences. The motion vector which leads to the minimum SAD may be selected as the best motion vector for the current reference list at the CU level. The motion vector may be refined at the CU and/or sub-CU level. A (e.g., each) sub-CU block may be assigned with a motion vector. A motion vector field may be constructed for the CU.

Figure 6:
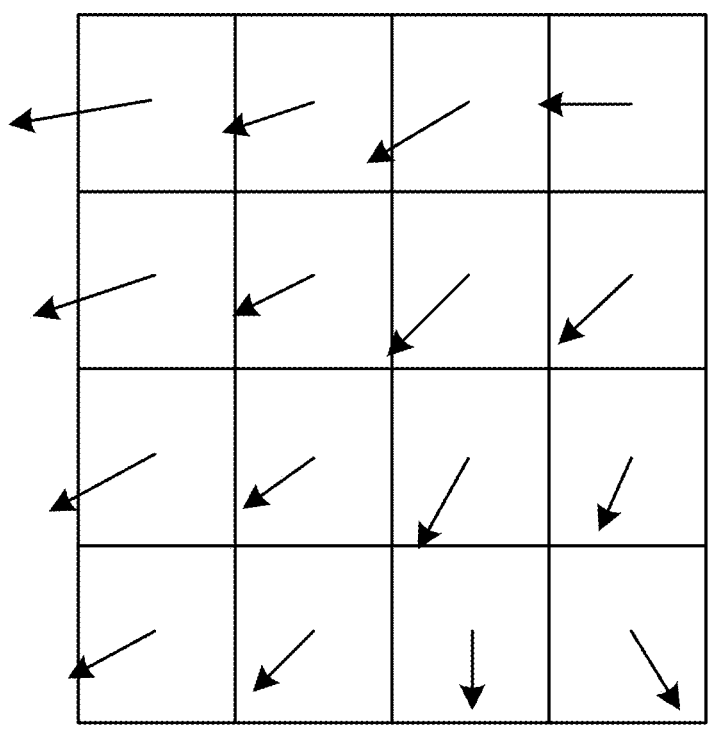
FIG. 6 is a diagram illustrating an example sub-coding unit (CU) motion vector field.

For Affine merge, ATMVP and STMVP, a motion vector field may be derived using respective corresponding methods, for example, rather than having only one motion vector for the CU. FIG. 6 provides an example motion vector field for a sub-CU inter prediction mode.

OBMC may be performed at the motion compensation (MC) stage. OBMC may use motion vectors from the neighbor blocks of a current block to perform motion compensation on the current block. OBMC may weigh the current block and/or the block that is fetched using one or more neighboring MVs with predefined weights. The neighboring MVs may be associated with neighboring blocks from a number of rows and columns close to the boundary of the current block and the neighboring blocks. If a current CU is predicted using an inter mode or a regular merge mode (e.g., explicit inter mode or regular merge mode), the MVs (e.g., only the MVs) from the neighboring blocks above and to the left of the current block may be used for OBMC to update the pixel intensity of the above and left boundaries of the current CU.

Figure 7:
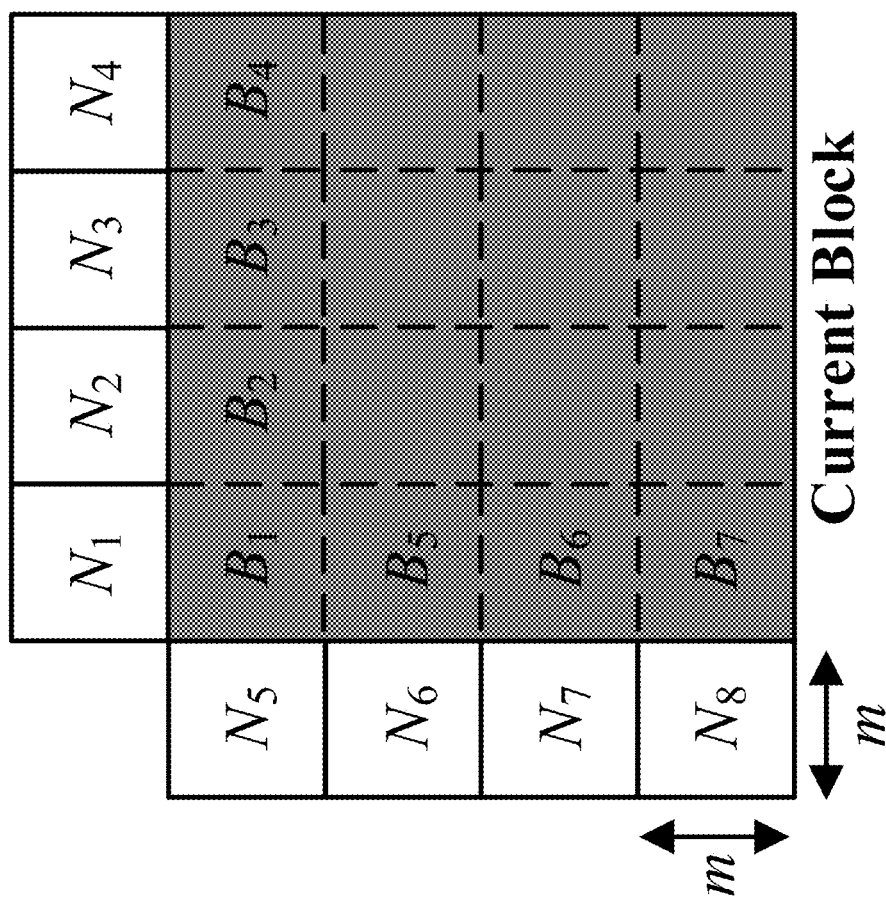
FIG. 7 is a diagram illustrating an example of applying overlapped block motion compensation (OBMC) in a CU-level inter prediction mode.

FIG. 7 shows an example of OBMC for a CU-level inter prediction mode, where m may be the size of the basic processing unit for performing OBMC, N1 to N8 may be sub-blocks in a causal neighborhood of a current CU (e.g., a current block), and B1 to B7 may be sub-blocks in the current CU in which OBMC may be performed. If the CU is predicted using a sub-CU inter prediction mode (e.g., FRUC, affine merge, ATMVP, and/or STMVP), OBMC may be performed on a sub-CU block (e.g., each of B1-B7) using MVs from one or more (e.g., all four) neighboring sub-CU blocks of the sub-CU block. The pixel value(s) associated with one or more (e.g., all four) boundaries of the sub-CU block may be updated using this technique.

Figure 8:
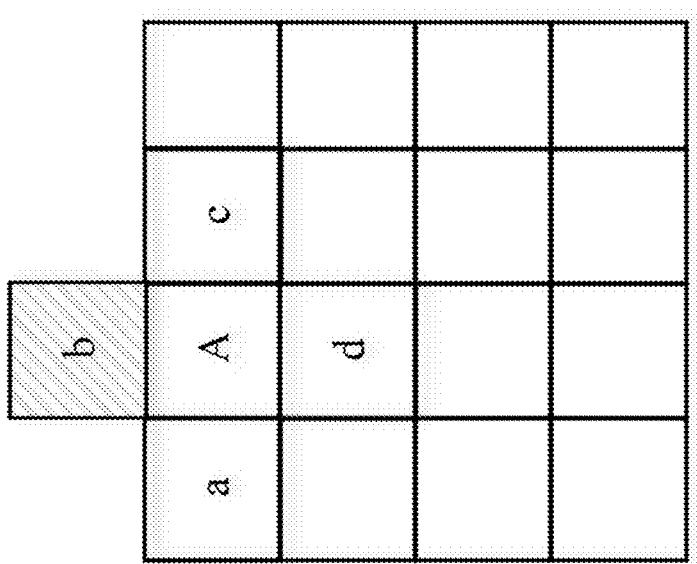
FIG. 8 is a diagram illustrating an example of applying OBMC in a sub-CU inter prediction mode.

FIG. 8 is an example of OBMC for a sub-CU inter prediction mode, where OBMC may be applied to one or more sub-CU blocks. For example, OBMC may be applied to one or more (e.g., all) sub-CU blocks, besides block b. OBMC may be applied to one or more of the sub-CU blocks such as sub-CU block A using MVs from one or more (e.g., all) of the four neighboring blocks (e.g. sub-CU blocks a, b, c, d) of the sub-CU block A.

Weighted average may be applied in OBMC to generate the prediction signal of a block. Denoting the prediction block identified using the motion vector of a neighboring sub-block as PN and the prediction block identified using the motion vector of a current sub-block as PC, when OBMC is applied, samples in the first and/or last four rows and/or columns of PN may be weight-averaged with samples at corresponding positions of PC (e.g., the first and/or last four rows and/or columns of PC).

The samples to which weighted average may be applied may be determined based on the location of a corresponding neighboring sub-block. For example, when the neighboring sub-block is an above-neighbor (e.g., sub-CU block b in FIG. 8), the samples in the first X rows of the current sub-block may be adjusted. When the neighboring sub-block is a below-neighbor (e.g., sub-CU block d in FIG. 8), the samples in the last X rows of the current sub-block may adjusted. When the neighboring sub-block is a left-neighbor (e.g., sub-CU block a in FIG. 8), the samples in the first X columns of the current block may be adjusted. When the neighboring sub-block is a right-neighbor (e.g., sub-CU block c in FIG. 8), the samples in the last X columns of the current sub-block may be adjusted.

The values of X and the weights to be applied may be determined based on the coding mode used to code the current block. For example, when the current sub-CU block size is larger than 4×4 (e.g., in terms of the granularity of the motion vectors), weighting factors $\{1/4, 1/8, 1/16, 1/32\}$ may be used for the first four rows or columns of PN and weighting factors $\{3/4, 7/8, 15/16, 31/32\}$ may be used for the first four rows or columns of PC. When the current sub-CU block is 4×4, the first two rows or columns of PN and PC (e.g., only the first two rows or columns of PN and PC) may be weight-averaged, and weighting factors $\{1/4, 1/8\}$ and $\{3/4, 7/8\}$ may be used for PN and PC, respectively.

Local illumination compensation (LIC) may be performed to address the issue of local illumination changes, for example, when the illumination changes are non-linear. A pair of weights and offsets may be applied to a reference block, for example, to obtain a prediction block. An example mathematical model of LIC may be given by the following equation (1):

$$P[x]=\alpha * P_r[x+v]+\beta, \quad (1)$$

where $P_r[x+v]$ may be the reference block pointed to by motion vector v, $[\alpha, \beta]$ may be a pair of weight and offset for the reference block, and $P[x]$ may be a prediction result block (e.g., the final prediction result block). The weight and offset pair may be estimated using techniques such as LLMSE (Least Linear Mean Square Error), which may utilize a template of the current block and/or a template of the reference block designated by the motion vector of the current block. By minimizing the mean square difference between the templates of the reference block and the current block, the mathematical representation of $\alpha$ and $\beta$ may be derived, as shown in equation (2) and (3):

$$\alpha = \frac{I \cdot \sum_{i=1}^{I}(P_c[x_i] \cdot P_r[x_i]) - \sum_{i=1}^{I}(P_c[x_i]) \cdot \sum_{i=1}^{I}(P_r[x_i])}{I \cdot \sum_{i=1}^{I}(P_r[x_i] \cdot P_r[x_i]) - \left(\sum_{i=1}^{I} P_r[x_i]\right)^2}, \quad (2)$$

$$\beta = \frac{\sum_{i=1}^{I}(P_c[x_i]) - \alpha \cdot \sum_{i=1}^{I}(P_r[x_i])}{I}. \quad (3)$$

where I may represent the number of samples in the template of the current block and the reference block, $P_c[x_i]$ may be the ith sample of the current block's template, and $P_r[x_i]$ may be the ith sample of the reference template that the corresponding motion vector is pointed to.

To apply LIC on bi-directional prediction, weight and offset estimation may be applied for a reference block (e.g., each of two reference blocks of a current block). An illustration of an example is given in FIG. 4. Using motion vectors $v_0$ and $v_1$, two templates $T_0$ and $T_1$ may be fetched for the reference blocks. By minimizing one or more illumination differences (e.g., separately) between the pairs of templates $T_C$ (e.g., a template of the current block) and $T_0$, and $T_C$ and $T_1$, corresponding pairs of weights and offsets may be derived in association with the two reference blocks. Prediction blocks (e.g., two prediction blocks) from multiple directions (e.g., two different directions) may be combined. An example solution for LIC bi-directional prediction may be given by equation (4):

$$P[x]=\tfrac{1}{2}(\alpha_0 * P_0[x+v_0]+\beta_0+\alpha_1 * P_1[x+v_1]+\beta_1), \quad (4)$$

where $[\alpha_0, \beta_0]$ and $[\alpha_0, \beta_1]$ may be the weight-offset pairs, and $v_0$ and $v_1$ may be the corresponding motion vectors for the reference blocks.

One or more picture prediction configurations may be used to predict a picture. One or more (e.g., two) types of temporal prediction configurations may be used, for example, for evaluating the performance of one or more (e.g., different) inter coding tools. For example, low-delay and random access configurations may be used for evaluating the performance of one or more (e.g., different) inter coding tools.

Low-delay configurations may be used. A low-delay configuration may not have a delay (e.g., a structural delay) between a coding order and a display order. A coding order may be equal to a display order. A low-delay setting may be useful for conversional applications, for example, with a low-delay requirement. One or more (e.g., two) coding configurations may be defined for a low-delay setting. In the configurations, a first picture (e.g., only the first picture) in the video sequence may be coded as I picture. The other picture(s) may be coded using uni-prediction (e.g., only uni-prediction, such as a low-delay P (LDP) configuration) and/or bi-prediction (e.g., only bi-prediction, such as low-delay B (LDB) configuration). In LDP and/or LDB configurations, a (e.g., each) picture may use (e.g., may only use) reference pictures that may precede the current picture in the display order. For example, the picture order counts (POCs) of the reference pictures (e.g., all the reference pictures) in reference picture list L0 and L1 (e.g., if LDB is applied) may be smaller than the current picture.

Figure 9:
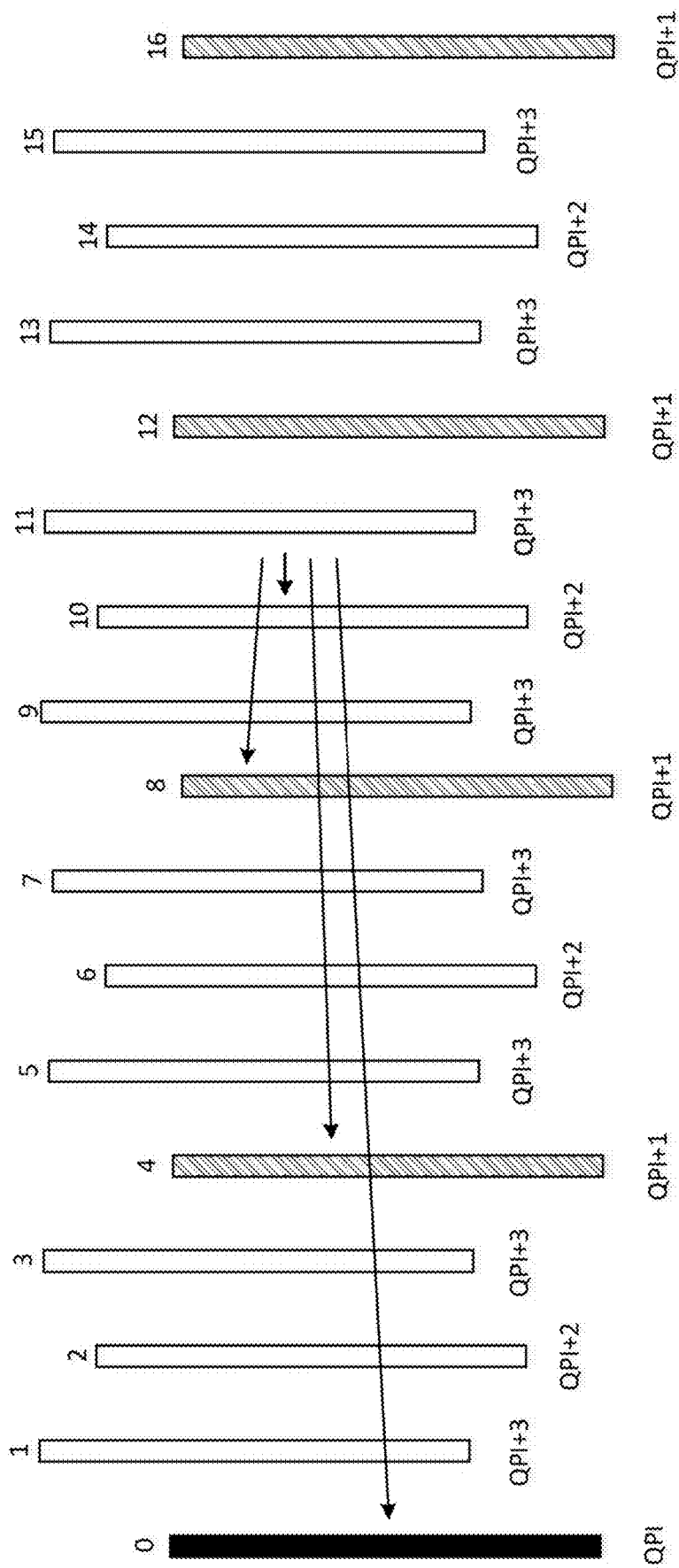
FIG. 9 is a diagram illustrating an example of a low-delay configuration.

FIG. 9 shows an example low-delay configuration. As shown in FIG. 9, a group of pictures (GOP) may include one or more key picture (e.g., the patterned blocks in FIG. 9) and/or pictures that may be located (e.g., temporally located) in-between two key pictures (e.g., the blank blocks in FIG. 9). In FIG. 9, the GOP size may be equal to 4. Previous pictures (e.g., four previous pictures) may be used for the motion-compensated prediction of a (e.g., each) current picture. The previous pictures (e.g., the four previous pictures) may include an immediately previous picture (e.g., which may be closest to the current picture) and three previous key pictures. For example, the picture Pic11 may be predicted from Pic10, Pic8, Pic4 and/or Pic0.

The example of FIG. 9 shows that pictures in a GOP may have different impacts on the overall coding efficiency. The coding distortion of a (e.g., each) key picture may determine the key picture's own coding performance and/or may propagate by temporal prediction into the following pictures that may make reference to the key picture. For example, because the key pictures may be more frequently used as reference to predict the other pictures, the coding distortion of a (e.g., each) key picture may determine the key picture's own coding performance and/or may propagate by temporal prediction into the following pictures that make reference to the key picture. One or more (e.g., varying) quantization parameter (QP) values may be assigned to one or more (e.g., different) pictures in a (e.g., each) GOP (as illustrated in FIG. 9). Among the pictures in a GOP, smaller QPs may be used to code the pictures at lower temporal layers (e.g., the key pictures). This technique may lead to an improved reconstruction quality than that of the pictures at high temporal layers.

A random-access configuration may be used. In a random-access configuration, a hierarchical B structure may be used. The coding efficiency achieved by a bi-direction hierarchical prediction may be higher than that of the low-delay configurations. Random-access configuration may result in display delay, for example, given that the coding order and/or the display order of pictures may be decoupled in random-access.

Figure 10:
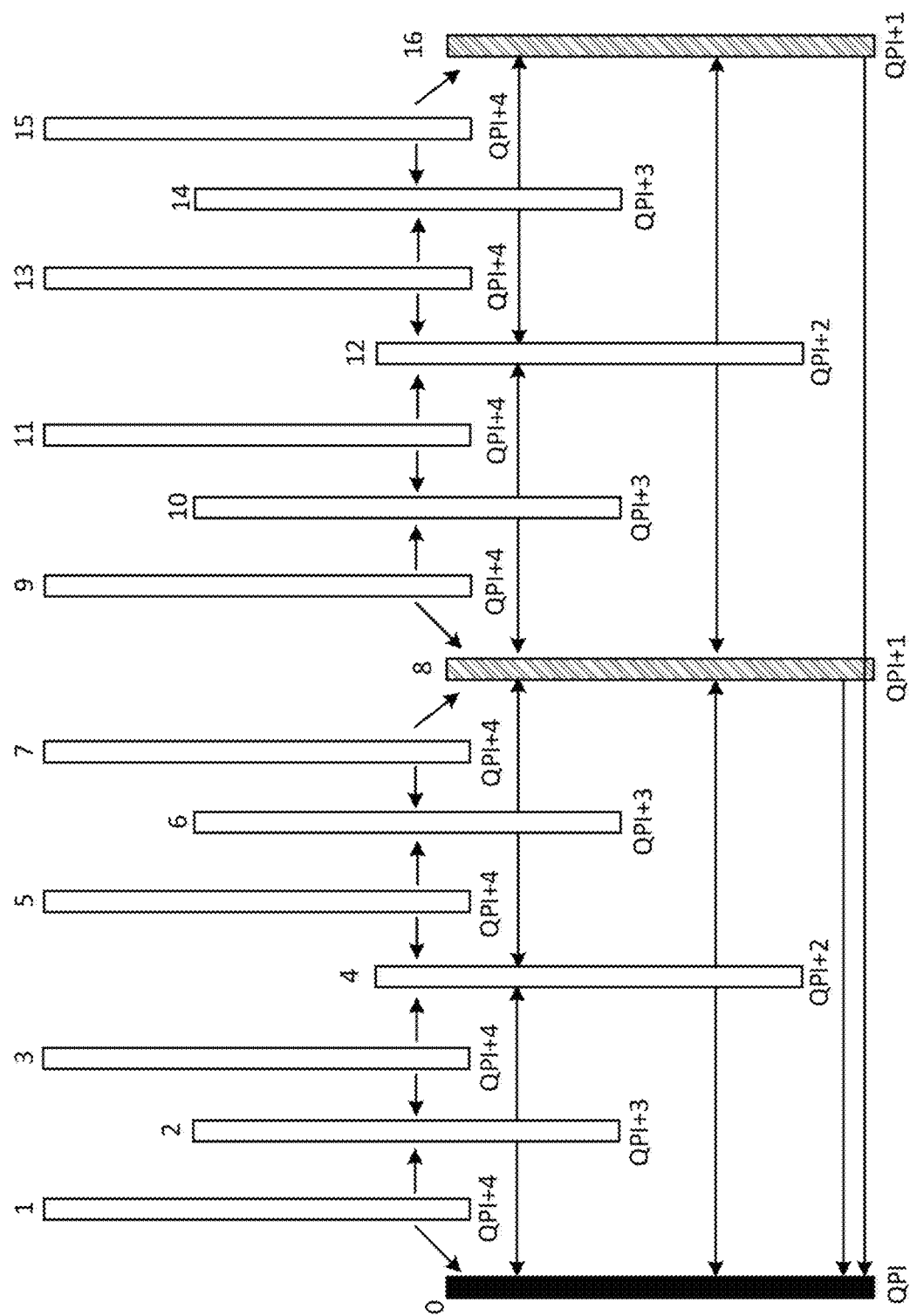
FIG. 10 is a diagram illustrating an example of a random configuration.

FIG. 10 shows an example hierarchical prediction structure with 4 dyadic hierarchy. For example, in random-access, a video sequence may be divided into multiple GOPs. A (e.g., each) GOP may contain one or more key pictures and pictures temporally located between two consecutive key pictures. A key picture may be intra-coded (e.g., to enable random access) and/or inter-coded. A key picture may (e.g., may only) be predicted using previously decoded pictures as references, for example, when the key picture is inter-coded. For example, for a (e.g., each) inter key picture, the POCs of the inter key picture's reference pictures (e.g., all of the reference pictures of the inter key picture) may be smaller than the POC of the key picture (e.g., which may be similar to the temporal prediction of the low-delay configurations).

The key pictures in a random-access configuration may be referred to as "low-delay pictures." After the key pictures are coded, the remaining pictures of the GOP may be coded based on hierarchical prediction, for example, by defining one or more (e.g., different) temporal layers. As shown in FIG. 10, a second layer and a third layer may include bi-predicted pictures that may be used to predict the pictures at a higher layer. The highest layer may contain pictures such as non-referenced bi-predicted pictures, for example, that may not be used to predict other pictures. Based on the importance of pictures in a GOP, unequal QPs may be applied to code different pictures in the GOP (e.g., similar to the low-delay configurations). Smaller QPs may be used for pictures at lower temporal layers (e.g., for better prediction quality). Higher QPs may be used for pictures at higher temporal layers (e.g., for larger bit-rate saving).

OBMC may be performed on a basic processing unit, for example, to enable OBMC for sub-CU inter prediction mode(s). The basic processing unit (e.g., a sub-CU block) may have a size of 4×4, for example, for various inter prediction modes. As the size of an OBMC processing unit decreases, the number of times to perform OBMC may increase. For the sub-CU inter prediction mode, boundary samples (e.g., all the boundary samples) from one or more (e.g., all four) neighboring directions may be updated. Neighboring sub-CU blocks (e.g., the 4 neighboring sub-CU blocks) for a current sub-CU block may be considered in an OBMC operation. For example, 4 neighboring sub-CU blocks for a current sub-CU block may be considered rather than 2 neighboring sub-CU blocks in certain CU level inter prediction mode. The number of boundary samples that may be processed may also increase in sub-CU level inter prediction. For example, in a CU level inter prediction mode, boundary samples processed by OBMC may include those located between a current CU and a neighboring CU while in a sub-CU inter prediction mode boundary samples processed by OBMC may include those located between sub-CU blocks within a same CU.

Motion vectors may have precision up to 1/16 pel. With fractional precision motion vectors (e.g., which may be used during motion compensation), samples outside a 4×4 processing unit may be fetched to perform inter sample interpolation. In OBMC, an 8-tap filter may be used to perform interpolation for the luma component, which may result in 7 more rows and columns outside the current blocks being fetched. As an example, denote OBMC block width and height as W and H, the number of samples involved in interpolation may be $(W+7)\cdot(H+7)$. The number of samples within an OMBC reference block may be $W\cdot H$. With OBMC, assuming that the width and height for an OBMC block are both 4, the ratio of the total number of samples used for interpolation and the total number of samples within an OBMC reference block may be $(W+7)\cdot(H+7)/W\cdot H \approx 7.5:1$. Thus, an OBMC unit may access 6.5 additional memory areas.

OBMC based on one or more neighboring blocks of a current block may be skipped for the current block or for one or more video components (e.g., the chroma components) of the current block. A decision to skip OBMC may be based on similarities between the motion vector associated with a neighbor block and the motion vector associated with the current block. For example, if a motion vector associated with the current block is substantially similar to (e.g., not substantially different from) a motion associated with a neighboring block, then OBMC based on the neighboring block may be skipped for the current block. A decision to skip OBMC for the chroma components may be based on similarities between respective luma prediction blocks derived with and without OBMC. For example, if a luma prediction block derived with OBMC (e.g., using neighbor motion vectors from one or more prediction directions) is substantially similar (e.g., not substantially different) to a luma prediction block derived without OBMC, then OBMC may be skipped for chroma components.

One or more interpolation filters with fewer filter taps may be used in OBMC (e.g., to reduce bandwidth consumption). Motion compensation and OBMC may be performed jointly, for example, to reduce the number of times motion compensation is performed. OBMC may be applied on combined sub-CU blocks that may share neighboring motion vectors.

Given a current block, OBMC based on a neighboring block may be skipped (e.g., not including the neighboring block in an OBMC operation of the current block) based on similarities between the respective motion vectors associated with the current block and the neighboring block. In examples, OBMC may be skipped for a 4×4 neighboring block when (e.g., only when) a motion vector from a current 4×4 block and a motion vector from the neighboring 4×4 block share the same reference frame/picture and/or are equal (e.g., are substantially similar to each other). In case of bi-prediction, OBMC may be skipped for the 4×4 neighboring block when the aforementioned conditions are satisfied in both prediction directions.

One or more of the following operations may be performed to determine whether OBMC should be skipped for a neighboring block (e.g., not including the neighboring block in an OBMC operation). For example, a determination may be made regarding whether the current block and the neighbor block are predicted using a same directional prediction mode (e.g., uni-directional or bi-directional mode). If the current block and the neighbor block are both uni-directionally or bi-directionally predicted, a further determination may be made regarding whether the respective motion vectors associated with the current block and the neighboring block refer to a same reference picture (e.g., based on whether the respective reference pictures have the same Picture Order Count). It should be noted that two motion vectors referring to the same reference picture may not mean that their reference pictures have the same reference index in the same reference list (e.g., because the same physical reference picture may appear more than once in one or both of the reference picture lists). If the foregoing conditions are satisfied (e.g., the current block and the neighbor block are both uni-directionally or bi-directionally predicted, and the respective motion vectors associated with the current block and the neighboring block refer to the same reference picture), the SAD of the x and y components of the relevant motion vectors may be computed and/or compared to a motion vector difference threshold value. If the SAD is smaller than the threshold (e.g., indicating that the relevant motion vectors are not substantially different), OBMC may be skipped for (e.g., may not include) the neighboring block. For bi-prediction, OBMC may be skipped for the neighboring block if the conditions described above are satisfied in both prediction directions.

The comparison of the SAD and the motion vector difference threshold may be illustrated by equation (5):

$$(\text{abs}(MV_{x0} - MV_{x1}^n) + \text{abs}(MV_{y0} - MV_{y1}^n)) \leq \text{thres} \quad (5)$$

where MV and MV″ may represent the motion vectors of the current block and/or the neighboring block, respectively. thres may represent the threshold for determining whether to skip OBMC for the neighboring block. The threshold may be signaled in a video bitstream, preconfigured/predefined on the coding device, and/or communicated to the coding device in other suitable ways. As described herein, different threshold values may be applied to a video block based on one or more characteristics of the video block including, for example, a temporal characteristic that may indicate whether the video block belongs to a low-delay picture, a priority of the video block, a desired quality of the video block, and/or the like. The subscripts x and y in Eq. (5) may indicate the respective horizontal and vertical components of each motion vector.

Figure 11:
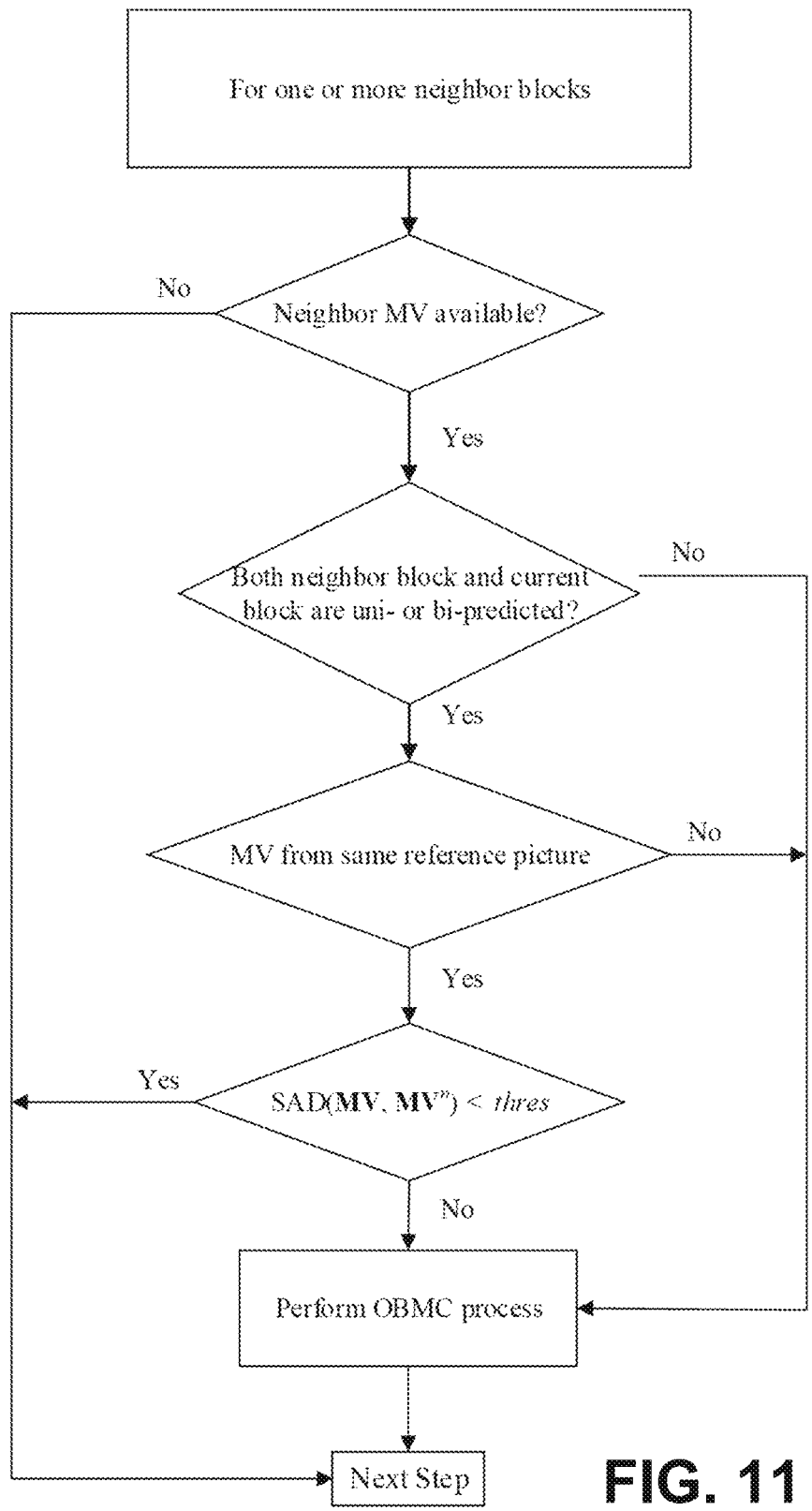
FIG. 11 is a flow chart illustrating example operations for determining whether OBMC should be skipped for a neighboring block based on motion vector similarities.

FIG. 11 is a flow chart illustrating example operations for determining whether OBMC should be skipped for (e.g., not including) a neighboring block based on motion vector similarities, as described herein. It should be noted that although the MV differences in horizontal and vertical directions are summed up in Equation (5) before being compared to the predetermined threshold, other tests for MV differences/similarities may be used. For example, MV differences in each of the horizontal and vertical directions may be compared to a separate threshold (e.g., a same threshold or different thresholds). In some examples, OBMC may be skipped if both the horizontal and vertical MV differences are smaller than their respective thresholds. In some examples, OBMC may be skipped if MV differences are smaller than the respective threshold in one of the horizontal or vertical direction.

The chroma components of a picture may be considered separately from the luma component. Compared to the luma component, the chroma components of a picture may have lower frequency and/or may be more easily predicted. Benefits from OBMC may be fewer for the chroma components than for the luma component. Thus, a larger threshold may be set for the chroma components, for example, to skip chroma OBMC for one or more blocks. Denoting the absolute motion vector difference threshold for the chroma components as thres_chroma, a condition for skipping OBMC for the chroma components may be given by Equation (6), and the alternative tests described for Equation (5) may be applicable to Equation (6) as well.

$$(abs(MV_{x0}-MV_{x1}'')+abs(MV_{y0}-MV_{y1}''))\leq thres\_chroma \quad (6)$$

Combining equations (5) and (6), motion vectors may be classified into one or more different categories, for example, depending on the SAD between the motion vectors. In a first category, the SAD between a current motion vector and the motion vector of a neighboring block is smaller than a first predefined threshold, e.g., SAD (MV, MV″)≤thres. In this category, OBMC may be skipped for both the luma and chroma components. In a second category, the SAD between the current motion vector and the motion vector of the neighboring block is greater than the first predefined threshold but smaller than a second predefined threshold, e.g., thres<SAD (MV, MV″)≤thres_chroma. In this category, OBMC may be performed on the luma component but not on the chroma components (e.g., skipped for the chroma components). In a third category, the SAD between the current motion vector and the motion vector of the neighboring block is greater than the second predefined threshold, e.g., SAD (MV, MV″)>thres_chroma. In this category, OBMC may be performed on the luma and chroma components. In at least some scenarios, a smaller threshold may be set for the chroma components than for the luma component.

Figure 12:
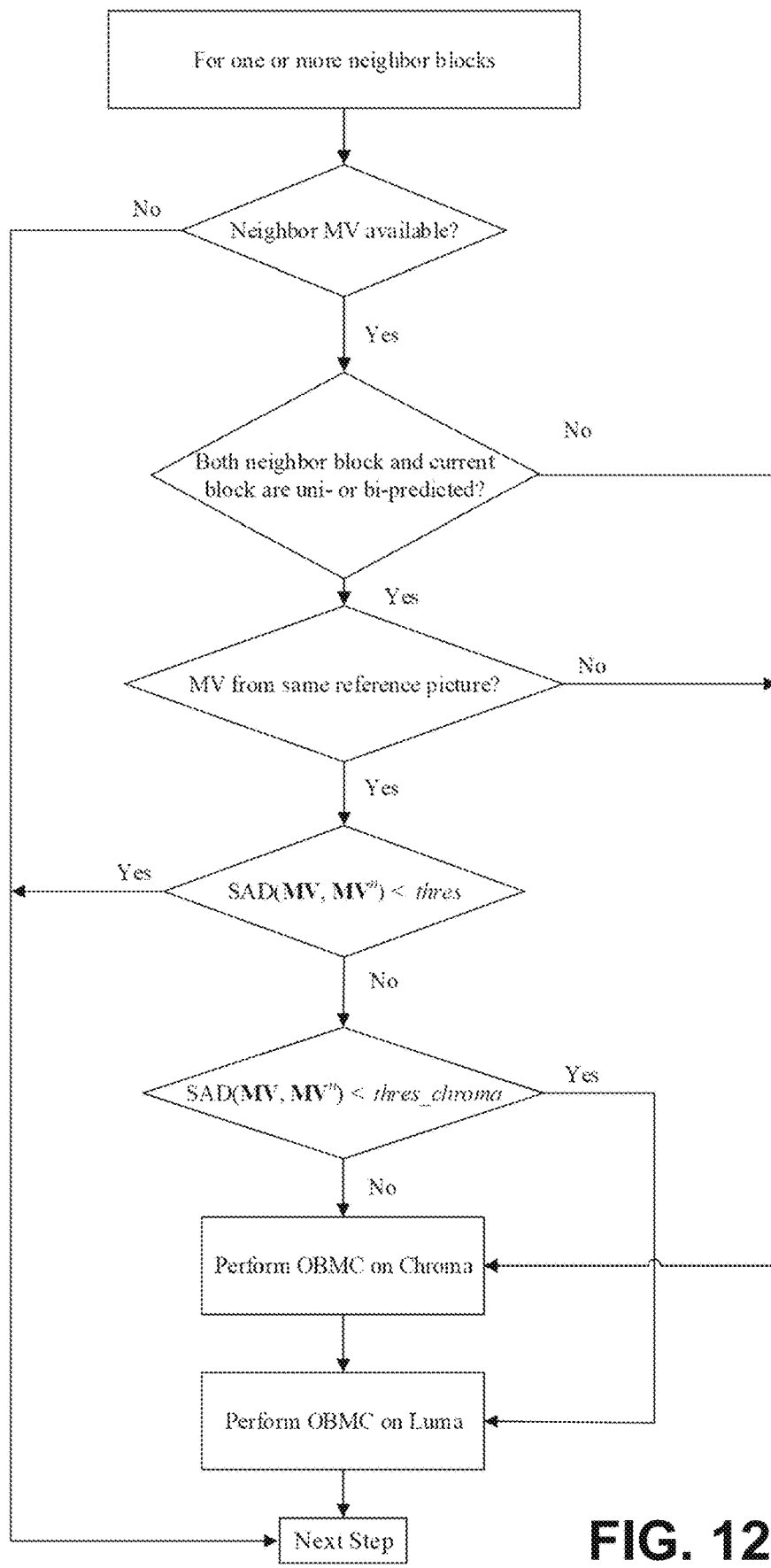
FIG. 12 is a flow chart illustrating an example of separately determining whether OBMC should be skipped for luma and chroma components.

FIG. 12 is a flow chart illustrating an example of separately determining whether OBMC should be skipped for luma and chroma components.

Different pictures within a group of pictures (GOP) may have different impacts on the overall coding efficiency. The impacts may be dependent on what prediction structure is applied. For example, with a random access configuration, low-delay pictures (e.g., key pictures such as those shown by patterned blocks in FIG. 10) may be more important than other pictures given that low-delay pictures may be used more frequently as temporal references during motion-compensated prediction of other pictures. OBMCs may be applied for low-delay pictures, for example, to reduce the blocking artifacts at the motion compensation stage for improved reconstruction quality. Less OBMCs may be applied for non-low-delay pictures, for example, to reduce encoding/decoding complexity. Thus, a decision of whether to skip OBMC for a current picture may be based on whether the current picture is a low-delay picture or a non-low-delay picture. For example, two MV difference thresholds (e.g., $thres_{LD}$ and $thres_{non\text{-}LD}$) may be defined for low-delay pictures and non-low-delay pictures, respectively. $thres_{LD}$ may be less than $thres_{non\text{-}LD}$. If the difference between a current MV and a neighboring MV is not larger than the corresponding threshold, OBMC may be skipped for a CU. If the difference between the current MV and the neighboring is larger than the corresponding threshold, OBMC may be applied for the CU.

The determination of whether or not a current picture is a low-delay picture may be made, for example, by checking the POCs of one or more reference pictures (e.g., all the reference pictures) of the current picture. If the POCs of the one or more reference pictures (e.g., all the reference pictures) are smaller than that of the current picture, the current picture may be determined as a low-delay picture. If the POCs of the one or more reference pictures (e.g., all the reference pictures) are not smaller than the current picture, the current picture may be determined as a non-low-delay picture. Whether or not the current picture is a low-delay picture may be signaled at a slice level.

As described herein, OBMC may use the MV(s) of one or more neighboring blocks to perform motion compensation (e.g., additional motion compensation) for a current block. OBMC may determine the weighted average of multiple prediction signals using the neighboring MV(s) (e.g., different neighboring MV(s)). In examples (e.g., when a neighboring MV points to a fractional sample position in a reference picture), interpolation filters (e.g., additional interpolation filters) may be applied, which may result in an increase in complexity. OBMC may be terminated early, for example, as described herein. A same MV threshold may be applied to one or more (e.g., all) neighboring blocks whether those blocks are uni-predicted (e.g., with one MV) or bi-predicted (e.g., with two MVs in both L0 and L1).

Whether a neighboring block is coded by uni-prediction or bi-prediction may affect the overall OBMC complexity. For example, when a neighboring block is bi-predicted, two temporal prediction signals in L0 and L1 may be generated and averaged (e.g., before being combined with the prediction signal of the current block). Two separate motion compensation interpolation processes (e.g., for respective prediction lists L0 and L1) may be performed. Computational complexity may increase (e.g., approximately double), e.g., compared to the case when the neighboring block is uni-predicted.

OBMC-based motion compensation (e.g., more OBMC-based motion compensation) may be disabled for neighboring blocks that are bi-predicted, for example, to reduce complexity. OBMC-based motion compensations (e.g., more OBMC-based motion compensation) may be enabled for neighboring blocks that are uni-predicted (e.g., while more OBMC-based motion compensation is disabled for bi-predicted neighboring blocks). Different thresholds for determining MV differences may be applied for early termination of OBMC, for example, based on whether a given (e.g., a selected) neighboring block is uni-predicted or bi-predicted.

Figure 13:
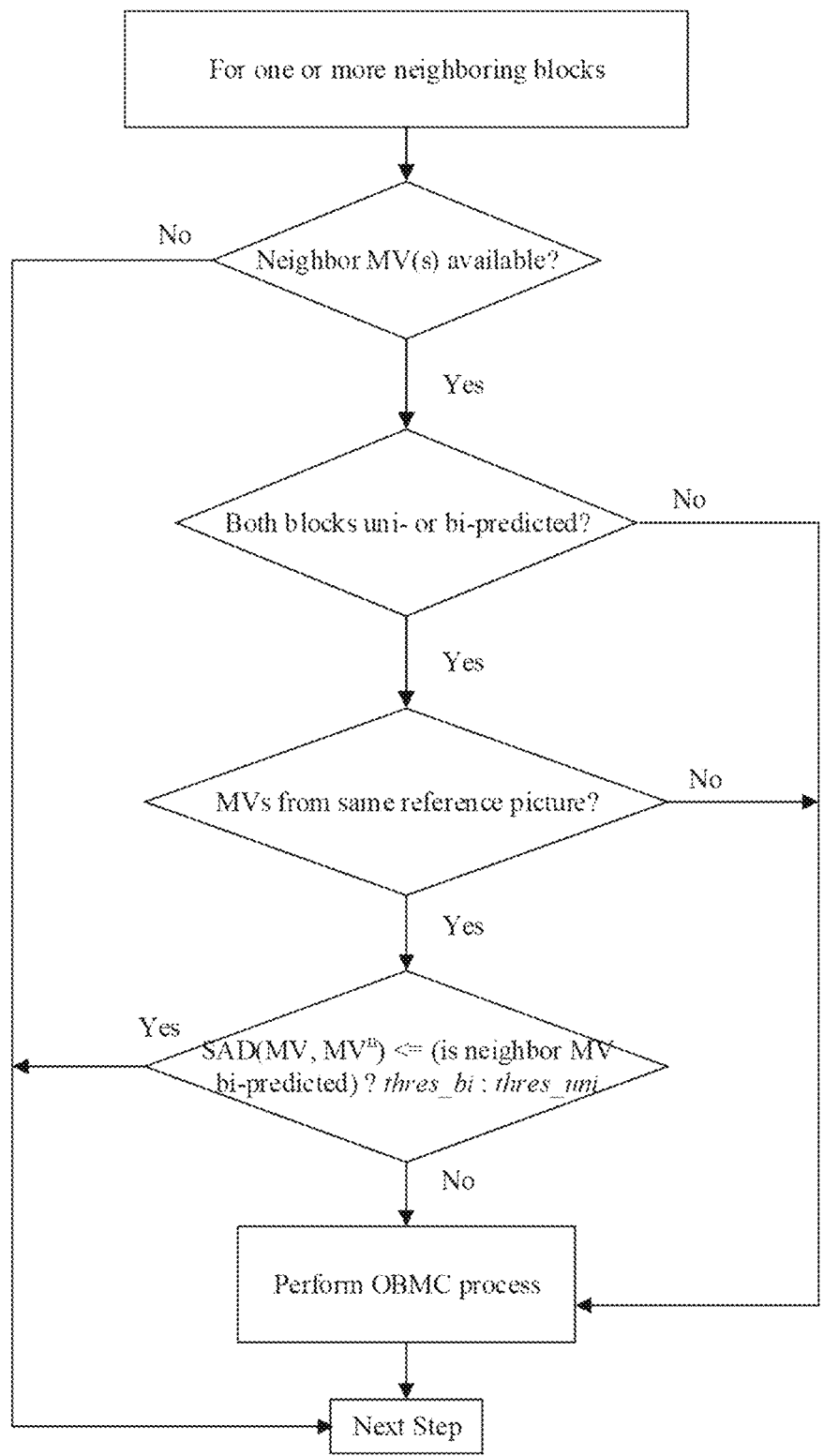
FIG. 13 is a flow chart illustrating an example of OBMC early termination.

FIG. 13 shows an example of OBMC when early termination is applied. In the example, two thresholds for determining MV differences, e.g., thres_uni and thres_bi (e.g., thres_uni may be less smaller than thres_bi) may be predefined for uni-predicted and bi-predicted neighboring MVs, respectively. If the difference between a current MV and a neighboring MV is no larger than a corresponding threshold, OBMC based on the neighbor may be skipped for the current CU. If the difference between the current MV and the neighboring MV is larger than the corresponding threshold, OBMC based on the neighbor may be applied for the current CU. Same thresholds may be used by an encoder and a decoder (e.g., to avoid additional signaling). The thresholds applied by an encoder may be signaled from the encoder to a decoder. The thresholds may be signaled at various locations inside a bitstream, e.g., in a sequence parameter set (SPS), a picture parameter set (PPS) or a slice segment header. The adaptation of a threshold value may be enabled at various coding levels (e.g., by signaling the threshold values at various locations of the bitstream). Different performance-complexity tradeoffs may be achieved, e.g., by enabling the adaptation of a threshold value at various coding levels.

Whether OBMC-based motion compensation associated with a neighboring block can be skipped may be determined based on whether a current MV and the neighboring MV are from a same reference picture, e.g., as shown in FIG. 13. OBMC-based motion compensation associated with a neighboring block can be skipped (e.g., always skipped) without determining whether the current MV and the neighboring MV are from a same reference picture (e.g., even if the current MV and the neighboring MV are from different reference pictures), for example, as long as the MV difference between the current MV and the neighboring MV is no larger than a corresponding threshold.

OBMC for chroma components may be skipped based on similarities of luma prediction blocks. For example, OBMC may be skipped for chroma components based on similarities between two luma prediction blocks derived with and without performing OBMC using neighbor motion vectors from one or more (e.g., all) prediction directions. In examples, current and neighboring motion vectors may not be similar. However, the reference blocks fetched using these motion vectors may still be similar to each other, resulting in no change (e.g., almost no change) between the prediction block derived after OBMC is performed (e.g., using a number of motion vectors from the current block and neighboring blocks) and the prediction block derived before OBMC is performed (e.g., using only motion vectors from the current block). If the luma component does not change (e.g., does not substantially change) after performing OBMC, the influence of OBMC on the chroma components may be small, for example, given the low-frequency characteristic of the chroma components. OBMC may be skipped for the chroma components.

The similarity between prediction blocks may be measured in different ways. For example, a measurement may include SAD computation, which may be a simple measurement. The SAD value may be computed between the prediction blocks before and after OBMC is applied for the luma component. The results may be compared with a SAD threshold value. If the SAD computed is equal to, or smaller than, the threshold value, OBMC for the chroma components may be skipped. For example, denoting the pixel luma intensity before OBMC as $x[n]_b$ and after OBMC as $x[n]_a$, and denoting the SAD threshold value as $SAD_{thres}$, the condition to skip OBMC for the chroma components may be illustrated by equation (7):

$$\sum_{n=0}^{15} \text{abs}(x[n]_b - x[n]_a) \leq SAD_{thres} \quad (7)$$

In Equation (7), the basic processing unit for OBMC may be 4×4 and the computation of SAD may consider 16 samples (e.g., 16 samples may be considered each time). Equation (7) may be adapted to be used with other processing unit sizes (e.g., 8×8, 16×16, 64×64, etc.) in OBMC.

Figure 14:
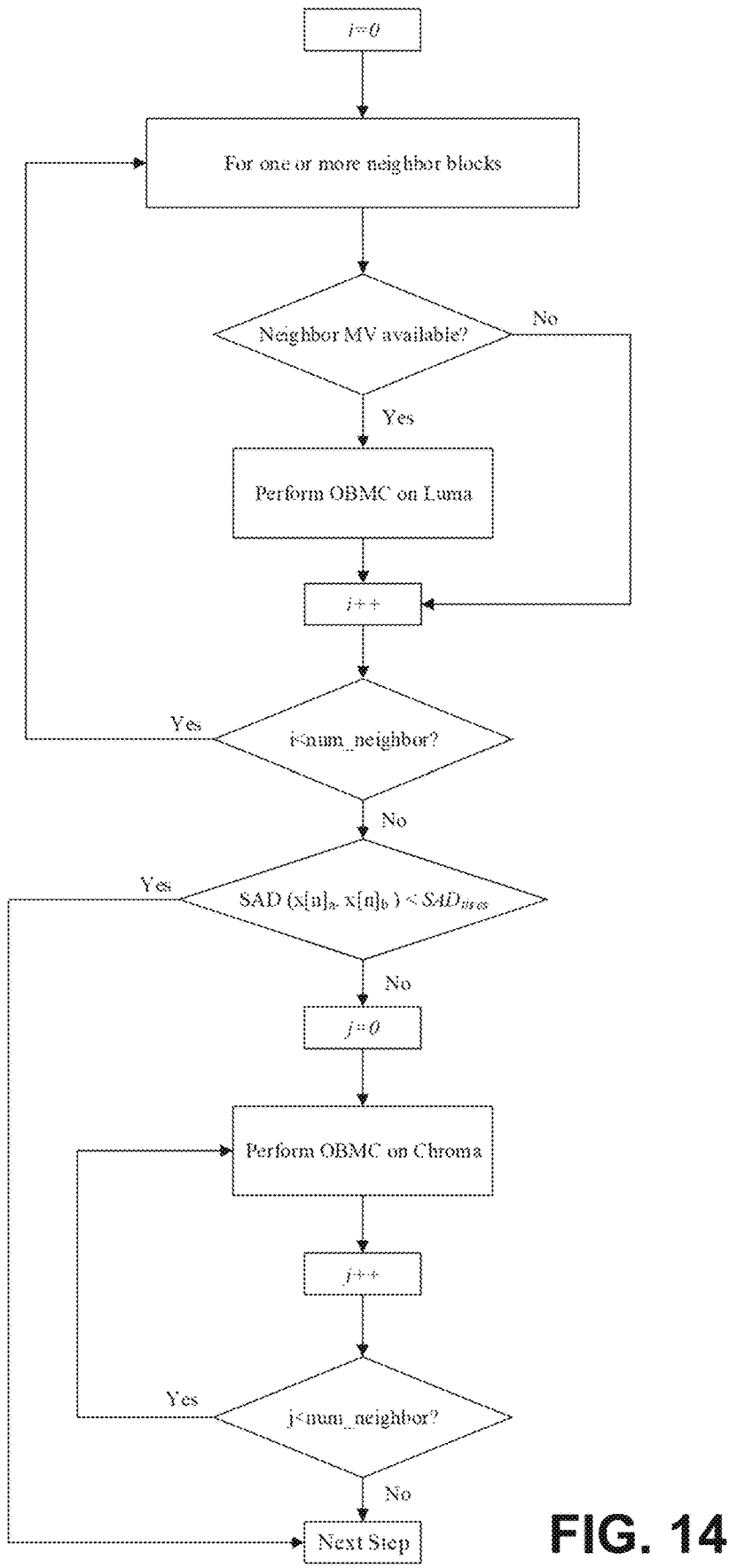
FIG. 14 is a flow chart illustrating an example of skipping chroma OBMC based on the sum of absolute difference (SAD) between luma prediction blocks before and after OBMC is applied.

FIG. 14 shows an example flow chart illustrating how chroma OBMC may be skipped based on the SAD between luma prediction blocks before and after OBMC is applied. In addition to or in lieu of SAD, other metrics, such as SSE, SATD, and/or SSIM, may be used as the threshold for determining whether chroma OBMC can be skipped. One such example may be given by equation (8):

$$D(x[n]_b, x[n]_a) \leq D_{thres} \quad (8)$$

where $D(\cdot)$ may be a distortion metric function and/$D_{thres}$ may be a corresponding threshold. Features described herein relating to skipping chroma OBMC (e.g., based on similarity of luma prediction blocks) may be combined with features described herein relating to skipping OBMC based on motion vector similarity or difference (e.g., based on similarities of motion vectors associated with a current block and neighboring blocks of the current block).

OBMC related filtering may be performed. For example, as described herein, the precision of motion vectors may be up to 1/16 pel. With fractional motion vectors, interpolation may be performed in the motion compensation stage. OBMC may use interpolation filters that may be used in regular motion compensation (e.g., using an 8-tap luma filter for luma sample interpolation and/or a 4-tap chroma filter for chroma sample interpolation). OBMC operations may be performed on basic storage units of size 4×4, in which case as many as seven more rows and columns outside the current block may be fetched for interpolation purposes (e.g., solely for interpolation purposes).

The one or more filters used in OBMC for luma and/or chroma components may be simplified, for example, to address the bandwidth issue described herein. For example, the 8-tap luma filter used for the luman component may be replaced with a simpler filter such as the 4-tap chroma filter. By using the 4-tap chroma filter for the luma component, the number of samples fetched for OBMC interpolation may be reduced from (W+7)·(H+7) to (W+3)·(H+3). For OBMC with basic processing units of size 4×4 (e.g., W=H=4), the number of samples used for interpolation may be reduced by 60% using a 4-tap filter instead of an 8-tap filter. The 8-tap filter may also be simplified by using a 2-tap bi-linear filter, which may reduce the number of samples used for interpolation by 20%.

Figure 15B:
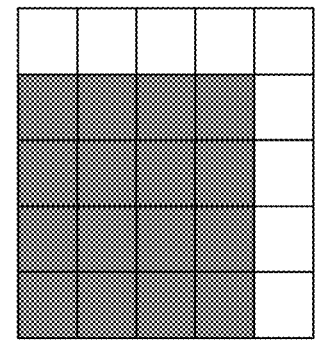
FIG. 15B is a block diagram illustrating the number of samples involved in simplified OBMC interpolation for the luma component with a bilinear filter.
Figure 15A:
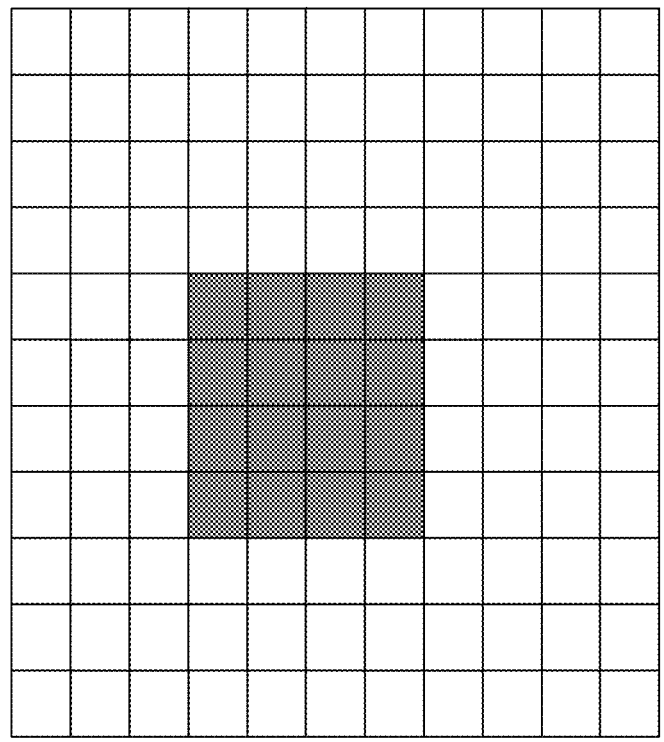
FIG. 15A is a block diagram illustrating the number of samples involved in OBMC interpolation for the luma component using an 8-tap filter.
Figure 15D:
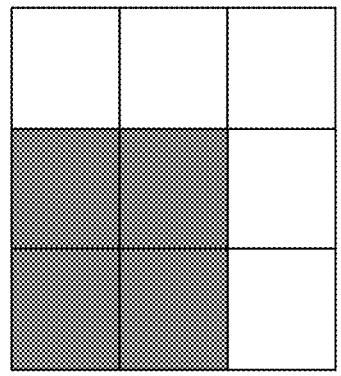
FIG. 15D is a block diagram illustrating the number of samples involved in simplified OBMC interpolation for the chroma components with a bilinear filter.
Figure 15C:
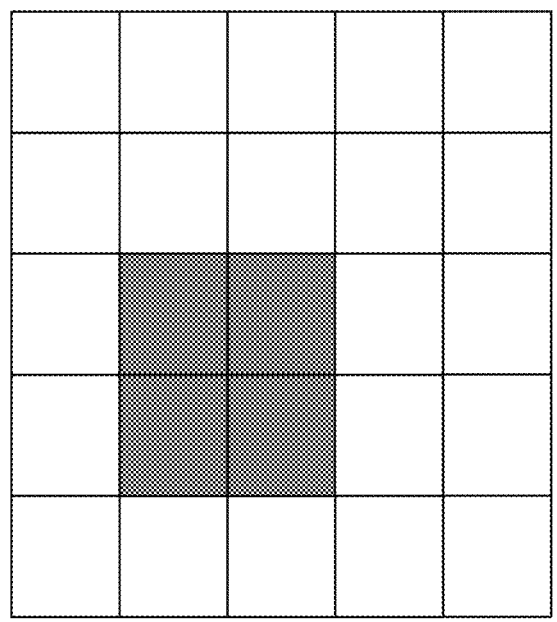
FIG. 15C is a block diagram illustrating the number of samples involved in OBMC interpolation for the chroma components with a 4-tap filter.

FIGS. 15A-D are block diagrams illustrating sample reduction by simplifying OBMC interpolation filter(s). FIG. 15A illustrates the number of samples involved in OBMC interpolation for the luma component using an 8-tap filter. FIG. 15B illustrates the number of samples involved in simplified OBMC interpolation for the luma component with a bilinear filter. For chroma components, simplification techniques similar to those used for the luma component may be followed. For example, the 4-tap chroma filter may be replaced by a 2-tap bi-linear filter, which may reduce the number of samples that may be involved in the interpolation process. FIG. 15C illustrates the number of samples involved in OBMC interpolation for the chroma components with a 4-tap filter. FIG. 15D illustrates the number of samples involved in simplified OBMC interpolation for the chroma components with a bilinear filter. By using a simpler filter, the number of samples to be accessed from memory may be reduced in the OBMC process.

OBMC and motion compensation may be combined (e.g., jointly performed, retrieving parameters that in one operation and use them in another operation, etc.), as opposed to being performed separately. Taking a sub-CU inter predicted CU with sub-CU block of size 4×4 as an example, when fetching prediction blocks to perform regular motion compensation for a sub-CU block, more row(s) and/or column(s) (e.g., two more rows and/or columns) in a (e.g., each) boundary direction may be fetched. After regular motion compensation has been completed (e.g., using an extended prediction block) for the sub-CU block, samples in the extended pixel region may be stored and/or used to perform OBMC.

Figure 16B:
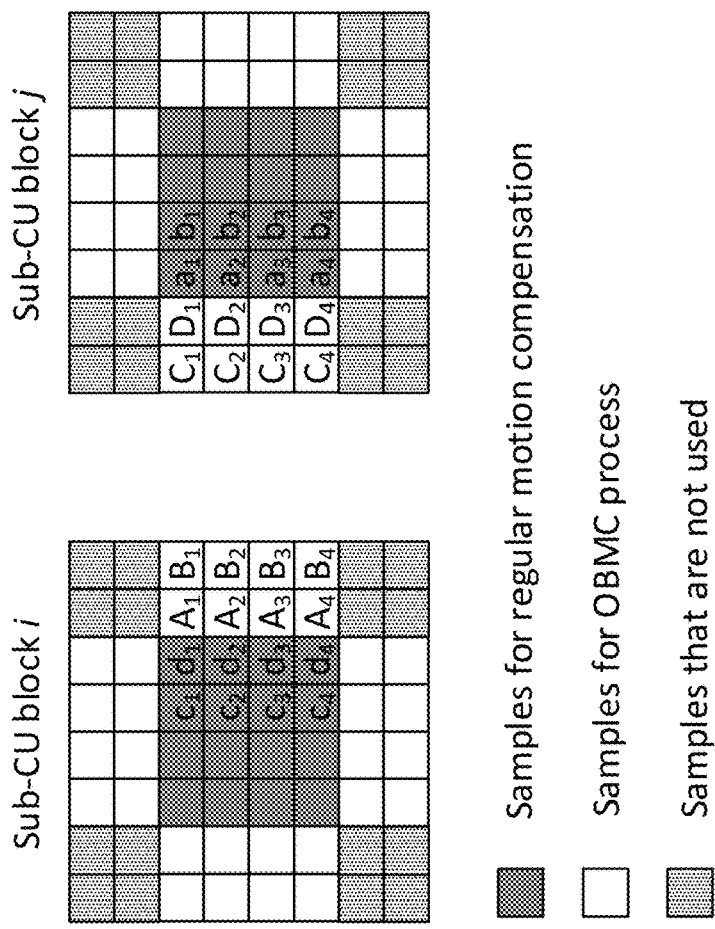
FIGS. 16A and 16B are block diagrams illustrating an example of jointly performing regular motion compensations and OBMC.
Figure 16A:
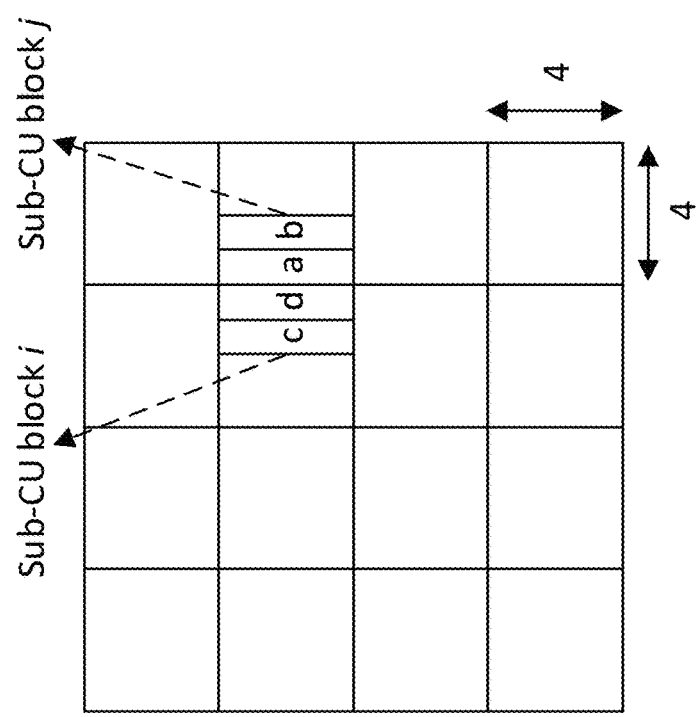

FIGS. 16A and 16B are block diagrams illustrating an example of jointly performing regular motion compensation and OBMC. FIG. 16A shows two sub-CU blocks i and j included within a CU that may be sub-CU inter predicted. c and d may be the right boundary columns of sub-CU block i, and a and d may be the left boundary columns of sub-CU block j. FIG. 16B illustrates example results after motion compensation is performed with extended prediction block(s) (e.g., extended regions).

As shown, when motion compensation is applied on sub-CU block i and/or j, additional (e.g., four additional) rows and columns of samples may be fetched for the sub-CU block than a regular prediction block (e.g., the regular prediction block may have the same block size as the sub-CU block i or j). For example, additional columns A and B may be fetched when performing regular motion compensation for sub-CU block i. The columns may be stored in memory (e.g., in an extended region buffer). Similarly, additional columns C and D may be fetched and/or stored when performing regular motion compensation for sub-CU block j. When OBMC is subsequently applied for sub-CU block i, columns C and D may be used to compensate (e.g., update) the right boundary sample values of columns c and d. When OBMC is applied for sub-CU block j, columns A and B may be used to compensate (e.g., update) the left boundary sample values of columns a and b.

Using column A as an example, Equation (9) illustrates how OBMC may be performed for samples $\{a_k, b_k, c_k, d_k\}$, using samples from an extended region (e.g., which may be stored in an extended region buffer):

$$a_k'=w_0 A_k+(1-w_0)a_k, k\in[0,3]$$

$$b_k'=w_1 B_k+(1-w_1)b_k, k\in[0,3]$$

$$c_k'=w_1 C_k+(1-w_1)c_k, k\in[0,3]$$

$$d_k'=w_0 D_k+(1-w_0)d_k, k\in[0,3] \quad (9)$$

where ($\{a_k, b_k, c_k, d_k\}$) and $\{a'_k, b'_k, c'_k, d'_k\}$ may represent sample values before and after OBMC is applied, $\{A_k, B_k, C_k, D_k\}$ may represent reference samples fetched from the extended region for updating the right-most two columns of sub-CU block i and left-most two columns of sub-CU block j, and $\{w_0 \; w_1\}$ may represent weights applied to the OBMC reference samples.

A coding device may determine whether to apply LIC to a current block based on an LIC flag associated with the current block. Alternatively or additionally, the coding device may use LIC flag(s) associated with one or more neighboring blocks to determine the applicability of LIC (e.g., when the one or more neighbor blocks are used to update boundary samples of the current block). These techniques may be modified to also use LIC flag(s) from the neighbor blocks at least for consistency purposes. Such modification may improve the performance of OBMC when LIC is enabled.

Regular motion compensation and OBMC may be combined. For example, when combined motion compensation is applied, the determination of whether to perform LIC may be made based on one or more neighboring blocks. The template for deriving LIC parameters may be changed from the current block to one or more neighboring blocks and the effects may be equivalent to (e.g., similar as) using LIC parameters of the neighboring block(s). By combining OBMC with motion compensation, the interaction between OBMC and LIC may be more reasonable, which may lead to better coding results.

OBMC may be performed for blocks that have the same or similar neighboring motion vector(s). As described herein, certain OBMC techniques may use a basic OBMC processing unit of size 4×4 regardless of the inter prediction mode of neighboring blocks. When a neighboring CU is predicted using CU level inter prediction mode (e.g., explicit inter prediction mode and/or regular merge mode), 4×4 blocks along the boundaries (e.g., all the boundary 4×4 blocks) of the neighbor CU may have the same or similar motion vectors. Performing OBMC on these 4×4 units separately may affect coding efficiency. Thus, it is contemplated herein that some 4×4 OBMC blocks may be combined to form a larger block, and OBMC for these 4×4 blocks may be performed jointly on the combined block.

Figure 17:
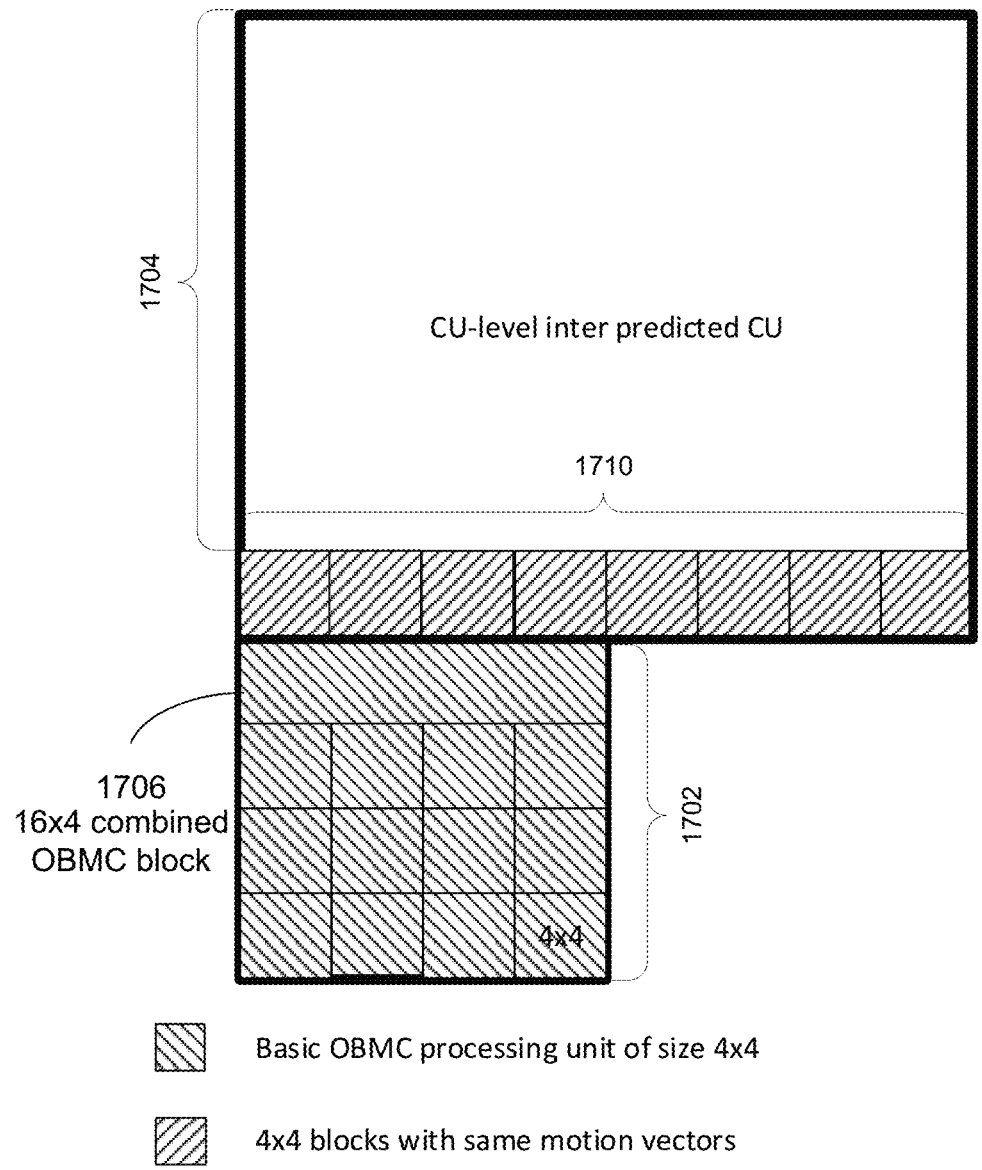
FIG. 17 is a block diagram illustrating an example of performing OBMC on a combined block comprising multiple basic OBMC processing units.

FIG. 17 is a block diagram illustrating an example of performing OBMC on a combined block comprising multiple basic OBMC processing units. As shown, a current CU 1702 may be sub-CU inter predicted and may comprise multiple 4×4 sub-CU blocks. Each of the 4×4 sub-CU blocks may be associated with a motion vector (e.g., a different motion vector). An above neighbor 1704 (e.g. a neighboring CU above the current CU) of the current CU may be inter predicted at the CU-level, and one or more (e.g., all) 4×4 blocks of the above neighbor 1704 that are located above the current CU 1702 may share a same motion vector(s). Some or all of the 4×4 blocks of the current CU 1702 may be combined to form a larger block 1706 (e.g., a 16×4 large block), and OBMC may be performed in the above direction on the combined block 1706. For example, instead of performing OBMC for each of the 4×4 blocks on the first sub-block row of the current CU 1702, OBMC may be performed on the larger block 1706 all at once.

If the current CU 1702 is CU level inter predicted and has a block size larger than 4×4, the four rows in the merged blocks 1706 may be updated, for example, using coefficients {¼, ⅛, ¹⁄₁₆, ¹⁄₃₂} for reference samples that are fetched using neighboring motion vectors (e.g., motion vectors of the above neighbor) jointly, and using {¾, ⅞, ¹⁵⁄₁₆, ³¹⁄₃₂} for samples in the current block before they are combined. If the current CU is sub-CU level inter predicted and has a granularity of 4×4, the first 2 rows (e.g., only the first 2 rows) of the merged blocks may be updated using coefficients {¼, ⅛} for reference samples that are fetched using neighboring motion vectors (e.g., motion vectors from the above neighbor) jointly, and {¾, ⅞} for samples in the current block before they are combined. For OBMC in the other neighboring directions, if the neighboring motion vectors for a 4×4 block (e.g., for each of the 4×4 blocks) within the merged block are different, OBMC may be performed (e.g., may have to be performed) on the 4×4 block (e.g., on each of the 4×4 blocks) in those directions.

Using the techniques described above, the number of times that reference blocks are fetched using motion vectors associated with block 1710 may be reduced. Coding complexity and/or bandwidth usage may be reduced accordingly. Using the example shown in FIG. 16, suppose L additional rows and columns are fetched for interpolation, if OBMC is performed separately on each basic 4×4 OBMC processing unit, the memory area accessed may be 4·(4+L)². If OBMC is performed on the combined block 1706, the memory area accessed may be (16+L)·(4+L), which is smaller than the former technique.

Figure 18:
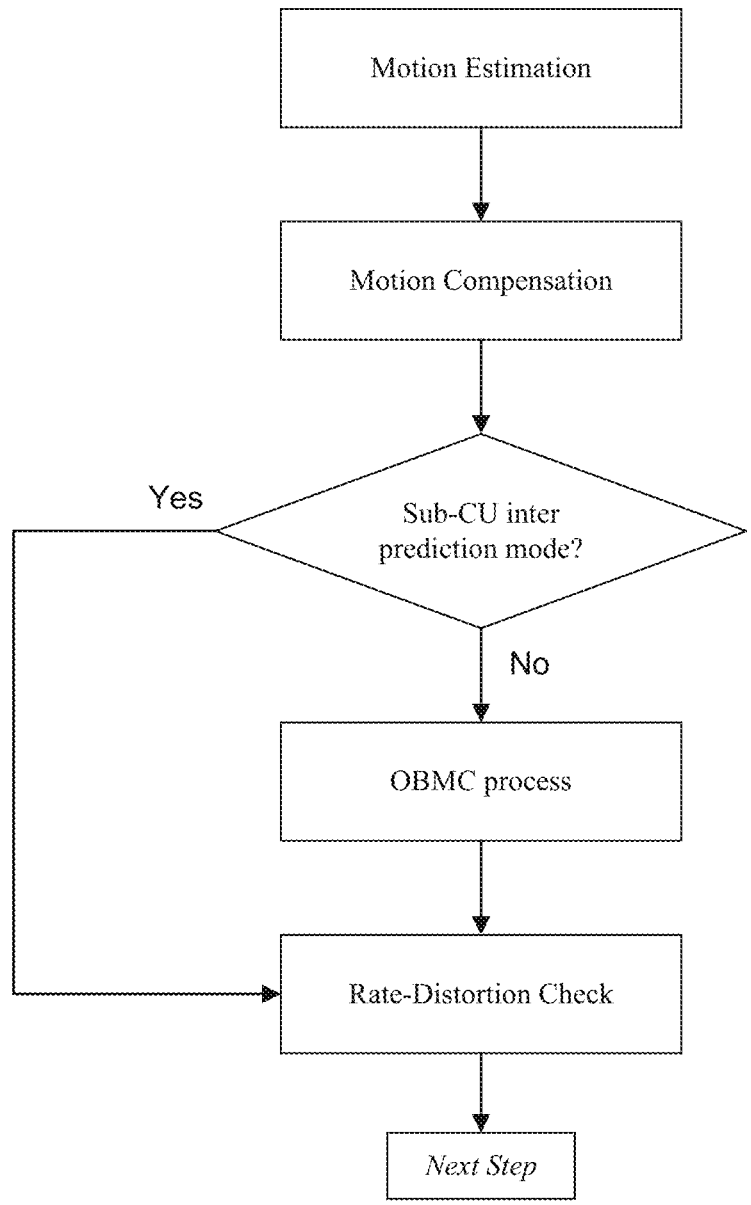
FIG. 18 is a flow chart illustrating an example of turning off OBMC for some or all sub-CU inter prediction modes.

OBMC may be performed for sub-CU inter prediction modes. As described herein, there may be numerous sub-CU inter prediction modes. In these sub-CU inter prediction modes, a motion vector field may be constructed, for example, in a refined manner, and/or with sub-CU block size ranging from 4×4 to 16×16. Sub-CU block size may be relatively small compared to CU size. Motion vectors associated with a sub-CU block may be similar to those associated with neighboring sub-CU blocks (e.g., all four neighboring sub-CU blocks). With similar motion vectors and/or small sub-CU block size, blocking artifacts may not be obvious in the boundary area(s) of a sub-CU inter predicted CU. Additionally, in one or more sub-CU inter prediction modes, OBMC may be performed in the boundary areas (e.g., in all 4 boundary areas) of a (e.g., each) sub-CU block, increasing the complexities of OBMC. Thus, OBCM may be turned off (e.g., skipped) for some or all sub-CU inter prediction modes including ATMVP, STMVP, FRUC, and/or affine modes. FIG. 18 shows a flow diagram illustrating how OBMC may be turned off for some or all sub-CU inter prediction modes.

Figure 19:
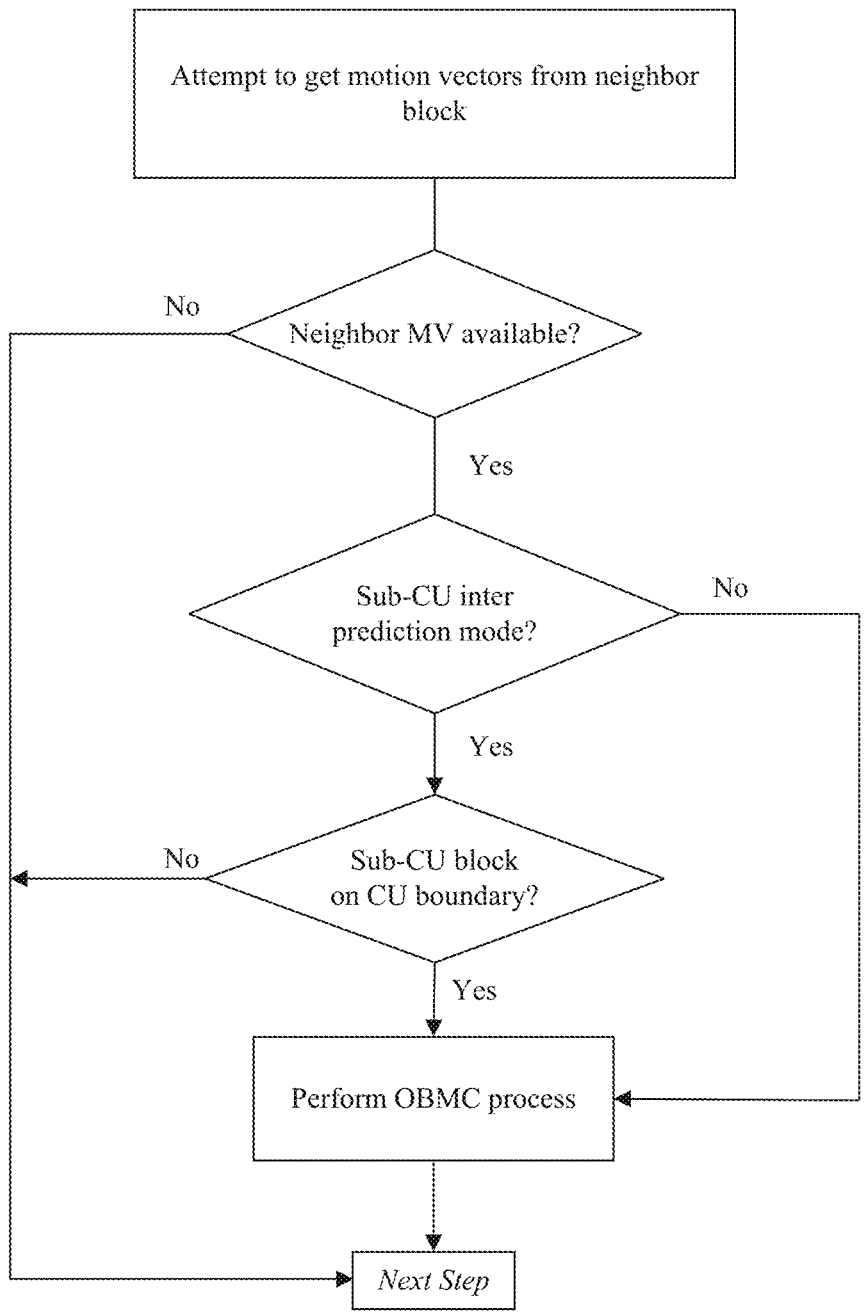
FIG. 19 is a flow chart illustrating an example of turning off OBMC for inner sub-CU blocks.

As described herein, the motion vectors of a sub-CU block and/or its neighboring sub-CU blocks may be similar. Such may not be the case, however, for a sub-CU block located in a first row or a first column of a current CU. For example, for a current sub-CU block in the first row of a current CU, the neighboring sub-CU blocks located above the current sub-CU block are from a different CU, and therefore may be coded using a different inter prediction mode (e.g., in terms of reference picture, prediction directions, etc.) than the current sub-CU block. As such, the motion vector(s) of this current sub-CU block and those of the neighboring sub-CU blocks (e.g., above neighbors) may be very different from each other. For similar reasons, the motion vector(s) of a current sub-CU block in the first column of the current CU and those of the corresponding neighboring sub-CU blocks (e.g., left neighbors) may also be very different from each other. Hence, the decision of whether to skip OBMC for a sub-CU block may be based on the location of the sub-CU block (e.g., the location of the sub-CU block relative to the CU boundaries). For example, OBMC may be skipped for sub-CU blocks that are located inside a CU. For sub-CU blocks located at or near one or more of the boundaries, OBMC may be performed. In examples, OBMC may be performed on boundary sub-CU blocks for those directions in which neighboring sub-CU blocks are located in a different CU. FIG. 19 shows an example flow chart illustrating the techniques described above.

A flag may be signaled for a sub-CU inter prediction mode (e.g., for each sub-CU inter prediction mode) to indicate whether OBMC should be performed on inner sub-CU blocks. For example, a coding device such as an encoder may perform rate distortion check twice (e.g., once with OBMC and again without OBMC) to decide whether to skip the OBMC for inner sub-CU blocks. The coding device may then encode and signal a flag to indicate whether OBMC should be performed on inner sub-CU blocks.

Figure 20:
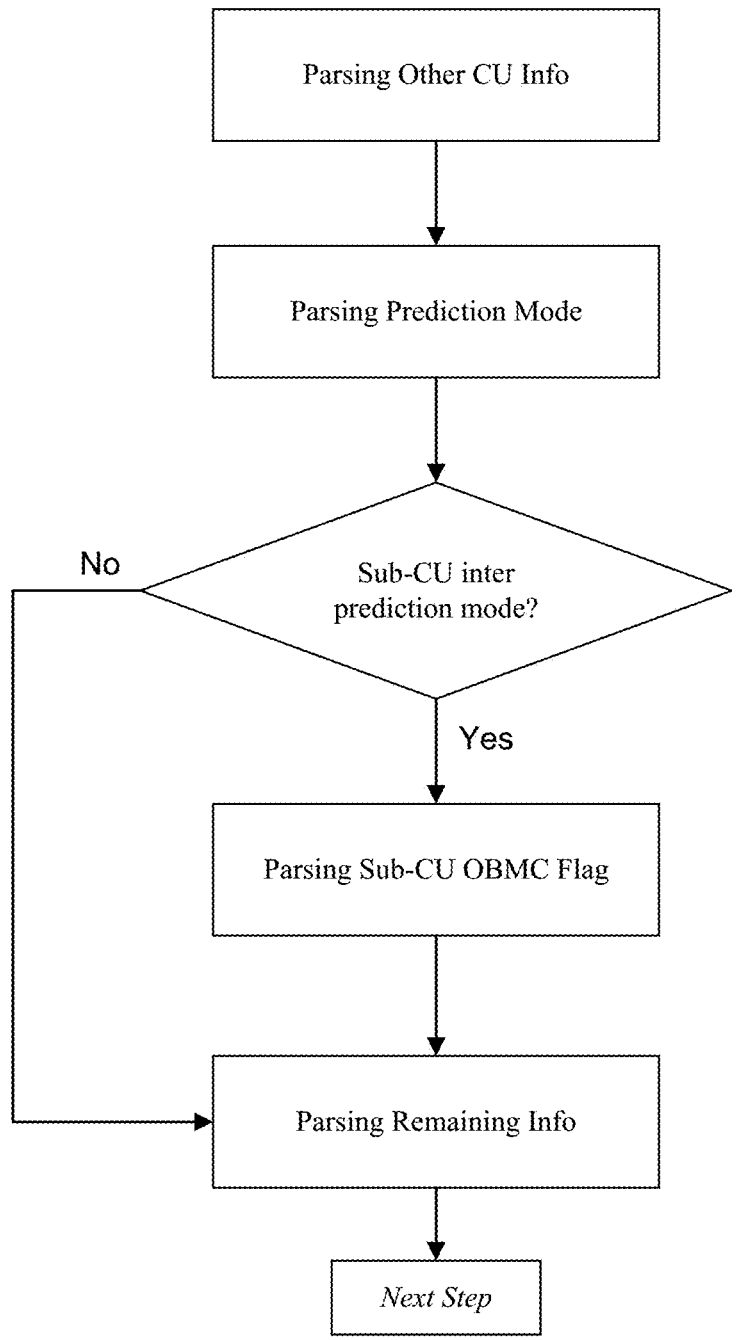
FIG. 20 is a flow chart of an example parsing of a sub-CU OBMC flag.
Figure 21:
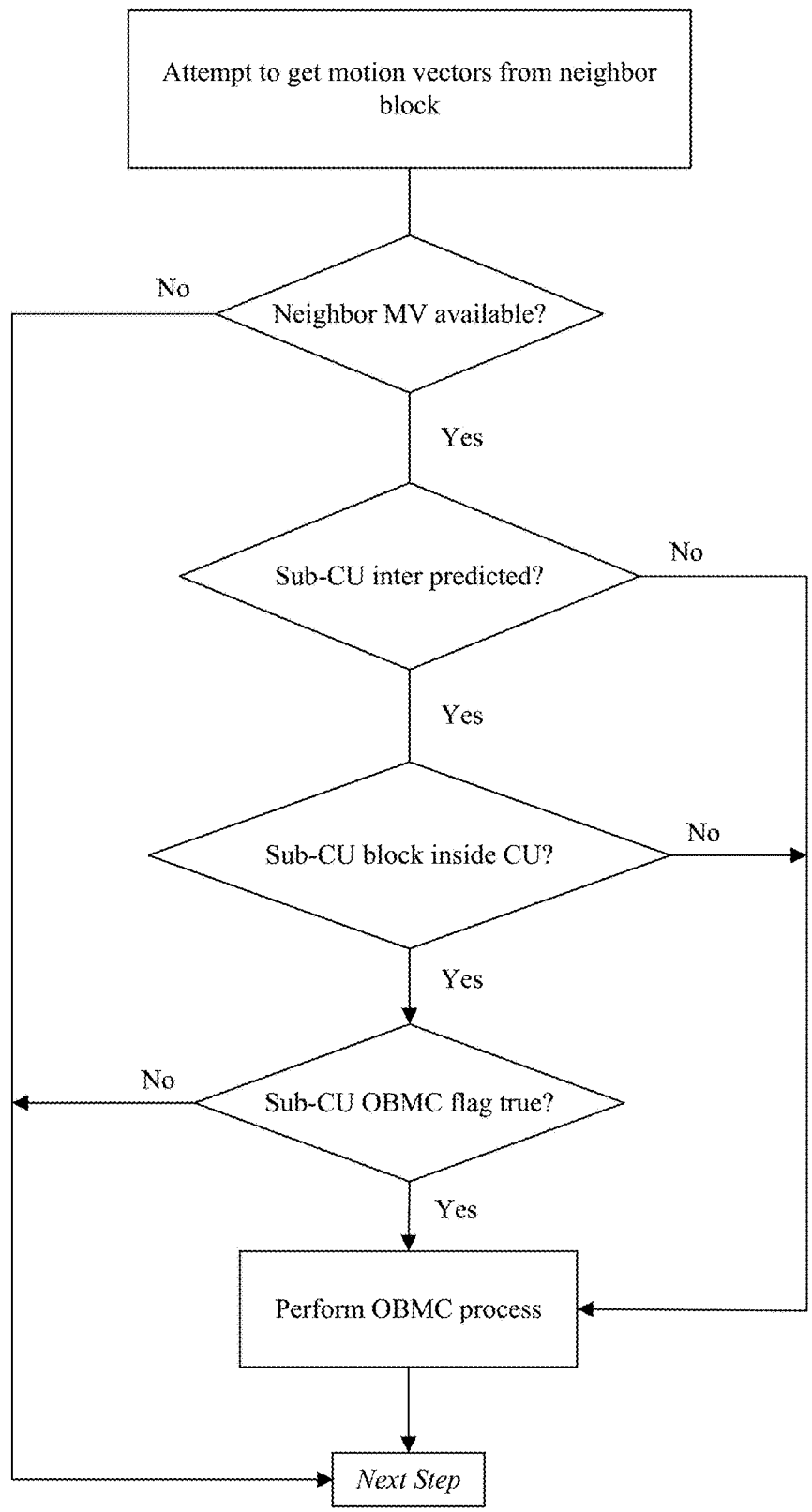
FIG. 21 is a flow chart of an example performing sub-CU OBMC based on a sub-CU OBMC flag.

The flag may be parsed (e.g., by a decoder) from a video bit-stream and used to control inner sub-CU block OBMC for one or more sub-CU inter prediction modes. FIGS. 20 and 21 show example flow charts illustrating example decoder behaviors associated with a sub-CU OBMC flag. Table 1 shows example syntax for deciding whether a sub-CU OBMC flag should be coded.

TABLE 1

Example syntax for deciding whether
a sub-CU OBMC flag should be coded.

```
isSubCUOBMCFlagCoded (CUToBeEncoded) {
    If (SubCUInterCodedCU == true) {
        return true
    }
    return false
}
```

Table 2 shows example syntax related to a sub-CU OBMC flag in a decoding process. The parameter Sub-CU_OBMC_Flag may be set to different values, which may specify one or more conditions. For example, Sub-CU_OBMC_Flag[x0][y0] may be set to 1 to specify that, for a current coding unit, OBMC may be performed on one or more (e.g., all) inner sub-CU blocks. Sub-CU_OBMC_Flag [x0][y0] may be set to 0 to specify that for a current coding unit, OBMC may be skipped for one or more (e.g., all) inner sub-CU blocks. The array indices x0, y0 may specify the location of the top-left luma sample of the coding block relative to the top-left luma sample of the current picture. When sub-CU_OBMC_Flag [x0][y0] is missing from (e.g., not present in) the video bitstream, it may be inferred that the value of sub-CU_OBMC_Flag[x0][y0] is 0.

TABLE 2

Syntax table of Sub-CU OBMC flag.

```
Coding_Unit(x0, y0, width, height){
    :
    :
    If (isSubCUOBMCFlagCoded (CU)) {
        Sub-CU_OBMC_Flag [ x0 ] [ y0 ]        u(1)
    }
    :
    :
}
```

The methodology describe above may also be used to signal a flag indicating whether OBMC should be skipped completely for one or more (e.g., all) sub-CU inter prediction modes.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method of decoding video data, comprising:
   determining a first motion vector and a second motion vector, wherein the first motion vector is associated with a first video block and refers to a reference picture, and wherein the second motion vector is associated with a second video block neighboring the first video block;
   determining that the second motion vector refers to the same reference picture as the first motion vector and that the first video block and the second video block are predicted using a same directional prediction mode;
   determining a difference between the first motion vector and the second motion vector; and
   decoding the first video block in accordance with the difference between the first motion vector and the second motion vector, wherein:
      based on a determination that the first motion vector is substantially different from the second motion vector, overlapped block motion compensation (OBMC) based on the second video block is performed for the first video block based on an extended prediction block associated with the second video block, wherein the extended prediction block comprises at least one more column or row of samples than a regular prediction block of the second video block that has a same block size as the second video block, and wherein the OBMC is performed for the first video block using the at least one more column or row of samples;
      based on a determination that the first motion vector is identical to the second motion vector, OBMC based on the second video block is skipped for the first video block; and
      based on a determination that the first motion vector is not identical to the second motion vector but is substantially similar to the second motion vector, OBMC based on the second video block is skipped for the first video block.

2. The method of claim 1, wherein the difference between the first motion vector and the second motion vector comprises a sum of absolute difference (SAD) between the first motion vector and the second motion vector, and the first motion vector is determined to be substantially different from the second motion vector if the SAD is equal to or greater than a threshold value.

3. The method of claim 2, wherein the threshold value is dependent on whether the second motion vector is a uni-prediction motion vector or a bi-prediction motion vector, and the threshold value used when the second motion vector is a bi-prediction motion vector is larger than the threshold value used when the second motion vector is a uni-prediction motion vector.

4. The method of claim 2, wherein the SAD between the first motion vector and the second motion vector is calculated as a sum of respective absolute differences between the first and second motion vectors in both the horizontal and vertical directions of the first and second motion vectors.

5. The method of claim 2, wherein the first motion vector is determined to be substantially different from the second motion vector on a condition that the SAD is equal to or greater than a first threshold value, and, on the condition that the SAD is equal to or greater than the first threshold value, OBMC based on the second video block is performed for both chroma and luma components of the first video block.

6. The method of claim 5, further comprising comparing the SAD to a second threshold value that is smaller than the first threshold value, wherein, on the condition that the SAD is between the first threshold value and the second threshold value, OBMC based on the second video block is performed only for the luma component of the first video block, and, on a condition that the SAD is smaller than the second threshold value, OBMC based on the second video block is skipped for both the chroma and luma components of the first video block.

7. The method of claim 1, wherein the directional prediction mode is a unidirectional prediction mode or a bidirectional prediction mode.

8. The method of claim 1, further comprising
   storing the at least one more column or row of samples in memory.

9. A video decoding device, comprising:
   a processor configured to:
   determine a first motion vector and a second motion vector, wherein the first motion vector is associated with a first video block and refers to a reference picture, and wherein the second motion vector is associated with a second video block neighboring the first video block;
   determine that the second motion vector refers to the same reference picture as the first motion vector and that the first video block and the second video block are predicted using a same directional prediction mode;
   determine a difference between the first motion vector and the second motion vector; and
   decode the first video block in accordance with the difference between the first motion vector and the second motion vector, wherein:
      based on a determination that the first motion vector is substantially different from the second motion vector, overlapped block motion compensation (OBMC) based on the second video block is performed for the first video block based on an extended prediction block associated with the second video block, wherein the extended prediction block comprises at least one more column or row of samples than a regular prediction block of the second video block that has a same block size as the second video block, and wherein the OBMC is performed for the first video block using the at least one more column or row of samples;

based on a determination that the first motion vector is identical to the second motion vector, OBMC based on the second video block is skipped for the first video block; and based on a determination that the first motion vector is not identical to the second motion vector but is substantially similar to the second motion vector, OBMC based on the second video block is skipped for the first video block.

10. The video decoding device of claim 9, wherein the difference between the first motion vector and the second motion vector comprises a sum of absolute difference (SAD) between the first motion vector and the second motion vector, and the first motion vector is determined to be substantially different from the second motion vector if the SAD is equal to or greater than a threshold value.

11. The video decoding device of claim 10, wherein the threshold value is dependent on whether the second motion vector is a uni-prediction motion vector or a bi-prediction motion vector, and the threshold value used when the second motion vector is a bi-prediction motion vector is larger than the threshold value used when the second motion vector is a uni-prediction motion vector.

12. The video decoding device of claim 10, wherein the SAD between the first motion vector and the second motion vector is calculated as a sum of respective absolute differences between the first and second motion vectors in both the horizontal and vertical directions of the first and second motion vectors.

13. The video decoding device of claim 10, wherein the threshold value is determined based on a temporal characteristic of the first video block that indicates whether the first video block belongs to a low-delay picture.

14. The video decoding device of claim 10, wherein the first motion vector is determined to be substantially different from the second motion vector on a condition that the SAD is equal to or greater than a first threshold value, and, on the condition that the SAD is equal to or greater than the first threshold value, OBMC based on the second video block is performed for both chroma and luma components of the first video block.

15. The video decoding device of claim 14, wherein the processor is further configured to compare the SAD to a second threshold value that is smaller than the first threshold value, wherein, on the condition that the SAD is between the first threshold value and the second threshold value, OBMC based on the second video block is performed only for the luma component of the first video block, and, on a condition that the SAD is smaller than the second threshold value, OBMC based on the second video block is skipped for both the chroma and luma components of the first video block.

16. The video decoding device of claim 9, wherein the first and second video blocks each have a block size of 4×4 pixels.

17. The video decoding device of claim 9, wherein the directional prediction mode is a unidirectional prediction mode or a bidirectional prediction mode.

18. The video decoding device of claim 9, wherein the processor is further configured to store the at least one more column or row of samples in memory.

19. The video decoding device of claim 18, wherein the at least one more column or row of samples comprises a left-side column of samples located along a left boundary of the extended prediction block, and, when performing the OBMC based on the second video block for the first video block, the left-side column of samples is used to compensate a right-side column of the first video block located along a right boundary of the first video block.

20. The video decoding device of claim 9, wherein, on a condition that the difference between the first motion vector and the second motion vector indicates that the first motion vector is substantially different from the second motion vector, OBMC based on the second video block is performed for a luma component of the first video block using a filter of a length shorter than 8 taps and OBMC based on the second video block is performed for a chroma component of the first video block using a filter of a length shorter than 4 taps.

21. The method of claim 1, wherein the first motion vector is determined to be substantially different from the second motion vector if the difference between the first motion vector and the second motion vector is greater than a preconfigured threshold.

22. The method of claim 1, wherein, based on the determination that the first motion vector is substantially different from the second motion vector, the OBMC based on the second video block is performed for both a luma component and a chroma component of the first video block.

23. The method of claim 1, wherein, based on the determination that the first motion vector is substantially different from the second motion vector, the OBMC based on the second video block is performed only for a luma component of the first video block.

24. The method of claim 8, wherein the at least one more column or row of samples comprises a left-side column of samples located along a left boundary of the extended prediction block, and, when performing OBMC based on the second video block for the first video block, the left-side column of samples is used to compensate a right-side column of the first video block located along a right boundary of the first video block.

25. The method of claim 8, wherein the extended prediction block comprises two more columns and two more rows of samples than the regular prediction block of the second video block, and wherein the two more columns and rows of samples are store in the memory and used to perform the OBMC for the first video block.

26. The video decoding device of claim 9, wherein the first motion vector is determined to be substantially different from the second motion vector in response to determining that the difference between the first motion vector and the second motion vector is greater than a preconfigured threshold.

27. The video decoding device of claim 9, wherein, based on the determination that the first motion vector is substantially different from the second motion vector, the OBMC based on the second video block is performed for both a luma component and a chroma component of the first video block.

28. The video decoding device of claim 9, wherein, based on the determination that the first motion vector is substantially different from the second motion vector, the OBMC based on the second video block is performed only for a luma component of the first video block.

29. The video decoding device of claim 18, wherein the extended prediction block comprises two more columns and two more rows of samples than the regular prediction block of the second video block, and wherein the two more columns and rows of samples are store in the memory and used to perform the OBMC for the first video block.

* * * * *